(12) United States Patent
Nguyen et al.

(10) Patent No.: US 8,794,084 B2
(45) Date of Patent: Aug. 5, 2014

(54) JAM-TOLERANT ELECTROMECHANICAL ACTUATOR

(75) Inventors: Dan T. Nguyen, Irvine, CA (US); Bruce W. Behar, Pasadena, CA (US); Ted A. McKay, Foothill Ranch, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 478 days.

(21) Appl. No.: 13/052,013

(22) Filed: Mar. 18, 2011

(65) Prior Publication Data

US 2011/0226075 A1 Sep. 22, 2011

Related U.S. Application Data

(60) Provisional application No. 61/315,242, filed on Mar. 18, 2010.

(51) Int. Cl.
| | |
|---|---|
| F16H 3/06 | (2006.01) |
| F16H 27/02 | (2006.01) |
| F16H 29/02 | (2006.01) |
| F16H 29/20 | (2006.01) |
| F16H 1/20 | (2006.01) |
| B64C 3/38 | (2006.01) |
| B64C 5/10 | (2006.01) |
| B64C 9/00 | (2006.01) |
| B64C 13/00 | (2006.01) |

(52) U.S. Cl.
USPC .................. 74/89.26; 74/89.23; 244/99.9

(58) Field of Classification Search
USPC .......... 74/89.25–89.31, 89.37–89.39, 424.71, 74/424.78; 188/67, 134, 378, 381; 192/141, 144, 150; 244/87, 90 R, 244/99.2–99.4, 99.9; 254/102; 310/80, 310/156.74, 75 A, 100; 318/469, 475, 476, 318/382
See application file for complete search history.

(56) References Cited

U.S. PATENT DOCUMENTS

| | | | | |
|---|---|---|---|---|
| 4,030,137 A | * | 6/1977 | Dalziel | 360/261.3 |
| 4,241,814 A | * | 12/1980 | Masclet | 188/266 |
| 5,145,041 A | * | 9/1992 | Hirai | 477/185 |
| 5,806,805 A | | 9/1998 | Elbert et al. | |
| 6,237,433 B1 | * | 5/2001 | Rodrigues | 74/89.39 |
| 6,325,188 B1 | * | 12/2001 | Wu | 188/381 |
| 7,100,870 B2 | | 9/2006 | Flatt | |
| 7,190,096 B2 | | 3/2007 | Blanding et al. | |
| 7,443,121 B2 | * | 10/2008 | Nagai et al. | 318/434 |
| 2008/0072695 A1 | * | 3/2008 | Hudson et al. | 74/89.25 |
| 2008/0203223 A1 | * | 8/2008 | Cyrot et al. | 244/99.3 |
| 2008/0236313 A1 | * | 10/2008 | Hodnefjell et al. | 74/89.29 |
| 2009/0090204 A1 | * | 4/2009 | Jones et al. | 74/89.39 |
| 2011/0048147 A1 | * | 3/2011 | Keech et al. | 74/89.26 |

* cited by examiner

Primary Examiner — Troy Chambers
Assistant Examiner — Jake Cook
(74) Attorney, Agent, or Firm — Renner, Otto, Boisselle & Sklar LLP

(57) ABSTRACT

Vehicles commonly include control-surfaces and other components that are selectively moved during operation among a plurality of positions. Movement of aircraft control-surface components is crucial in flight, and an actuating assembly must consistently and dependably perform during normal operation and be prepared to survive situations outside normal operation and/or to compensate for circumstances causing loss of actuator control. Jam tolerant electromechanically operated actuation systems, of both the rotary and linear types, together with their methods of operation are described herein. Specifically, electrical jam-detection and control systems and associated locking and damping devices can be electrically and mechanically engaged and disengaged, are automatically reversible, and are testable.

20 Claims, 20 Drawing Sheets

Wide Temp Simplex JTLEMA – Mechanical Schematic

Stored Energy Device (SED)

The SED is a preloaded spring stack that is released by energizing a solenoid. The SED provides the force and motion required to 1) Lock the Damper Detent, 2) Close the mechanical switch to enable the Damper, 3) Enable the Fail-Safe Position Latch, and 4) Disconnect the Ballnut Coupler FIG. 17 Dual Ball Nut Disconnect System (DBNDS)

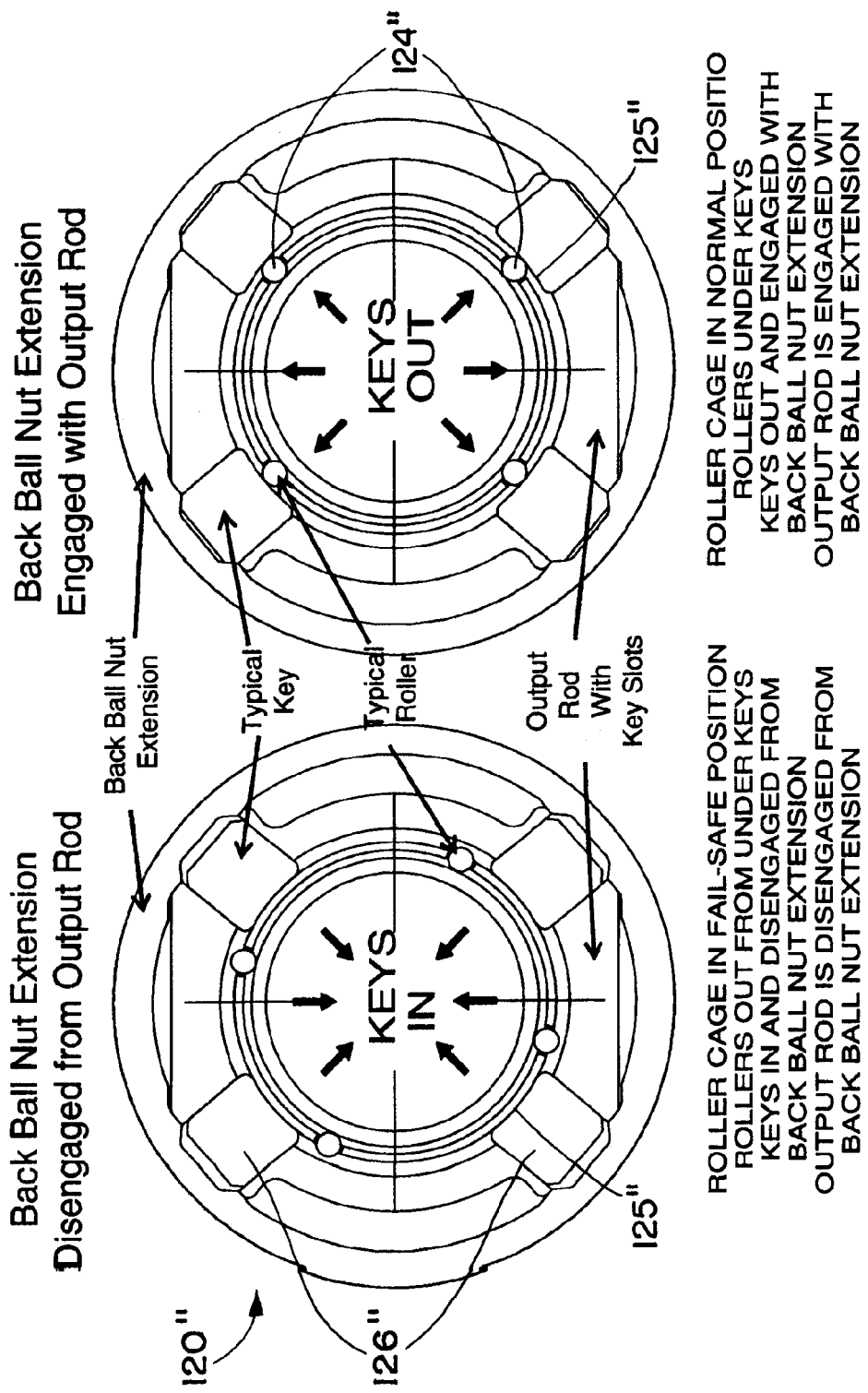

JAM-TOLERANT ELECTROMECHANICAL ACTUATOR

RELATED APPLICATIONS

This application claims the benefit of U.S. Provisional Application No. 61/315,242 filed Mar. 18, 2010, which is hereby incorporated herein by reference.

The present invention pertains to jam tolerant electromechanically operated actuation systems, of both the rotary and linear types, together with their methods of operation that can be utilized wherever such actuation systems are required, e.g., in vehicles, etc. Specifically, this invention pertains to electrical jam-detection and control systems and associated locking and damping devices that can be electrically and mechanically engaged and disengaged, that are reversible, and that are testable.

BACKGROUND

Vehicles such as manned and unmanned aircraft, marine, submarine, spacecraft, and ground vehicles commonly include control-surfaces and other components (e.g., stabilizers, rudders, elevators, flaps, ailerons, spoilers, slats, arms, etc.) that are selectively moved during operation among a plurality of positions. Selective movement can be achieved by an actuating assembly comprising an actuator, to which the control-surface component is attached, and means for providing actuator-moving power to the actuator. Specifically, movement of aircraft control-surface components is crucial in flight, whereby an actuating assembly must consistently and dependably perform during normal operation. Moreover, the actuating assembly must be prepared to survive situations outside normal operation and/or to compensate for circumstances causing loss of actuator control.

SUMMARY

The jam-tolerant electromechanical assembly described herein will make electromechanical actuators safer for primary flight control. The elimination of a mechanical jam potential in electromechanical actuators removes the last remaining technical obstacle that prevents electromechanical actuators from being used in primary flight control applications.

According to one aspect, a Damper System within a Simplex Jam-Tolerant Electromechanical Actuator (JTEMA) enables a passive, controlled (damped) rate of return of the JTEMA output and movable surface to a fail-safe position, plus a latching feature that captures and holds the output and movable surface when it reaches the fail-safe position. This damper system is activated whenever electrical power to the JTEMA is lost, or after an internal jam of the JTEMA requires decoupling of the ball nut from the output and movable surface. Furthermore, the damper system is ground testable and self-resettable.

According to another aspect, a Ball Nut Disconnect System (BNDS) for the Simplex Jam-Tolerant Electromechanical Actuator relies upon stored energy to provide a means to decouple the Ball Nut from the output and moveable surface upon loss of electrical power to the EMA even if the actuator is loaded up to the stall load. Furthermore this feature is ground testable and self-resettable.

According to another aspect, a Dual Ball Nut Disconnect System (DBNDS) for a Dual Jam-Tolerant Electromechanical Actuator combines the functions of two separate Ball Nut Disconnect Systems into one dual-purpose system in order to allow sharing of components, a reduced envelope, and reduced weight. Additionally, for actuators requiring ballistic tolerance, because the DBNDS co-locates the disconnect mechanisms for both ball nuts, it minimizes the amount of armored shielding needed for protection and provides for additional weight savings by enabling an EMA architecture that is partially sacrificial and thus does not require ballistic shielding.

According to one aspect of the present invention, an electromechanical actuator, includes a motor having a motor drive train that drives a screw, the screw coupled to a nut that is axially movable relative to the screw to control movement of an output rod connected to a movable surface; a damper assembly coupled to the output rod and including a damper and a damper drive train, wherein, in a normal motor operating state, the output rod is coupled to the nut to thereby control movement of the movable surface with the motor; and in a motor malfunction mode, the damper assembly is engaged to the output rod to provide a controlled rate of return of the movable surface to a fail-safe position.

According to another aspect, the damper assembly further includes a damper detent mechanism which couples the output rod to the damper in a normal damper operating state and which decouples the output rod from the damper in a damper malfunction state.

According to another aspect the damper assembly further including a latch that restricts movement of the output rod in a fail-safe mode and thereby restricts movement of the movable surface.

According to another aspect, the damper assembly includes a damper screw coupled to the damper drive train, a damper nut coupled to and axially movable relative to the damper screw, and wherein the latch engages the damper nut in the fail-safe mode to thereby limit movement of the damper nut relative to the damper screw.

According to another aspect, the damper nut is coupled to the output rod.

According to another aspect of the present invention, an electromechanical actuating assembly includes a motor having a motor drive train that drives a screw, the screw coupled to a nut that is axially movable relative to the screw to control movement of an output rod; a nut disconnect system including at least one coupler key movable between a locked position in which the key maintains coupling between the output rod and the nut to thereby control movement of the output rod with the motor and an unlocked position in which the key decouples the output rod from the nut to thereby remove control of the output rod from the motor.

According to another aspect, the nut disconnect system includes a release mechanism operable to decouple the nut from the output rod by moving the key to the unlocked position.

According to another aspect, the release mechanism is a solenoid-operated release mechanism.

According to another aspect, the release mechanism is powered by stored energy electronics that automatically release stored energy to activate the release mechanism upon a loss of power to the electromechanical actuating assembly.

According to another aspect, the nut disconnect system includes a drive mechanism coupled to the stored energy electronics and the nut coupler, the drive mechanism transmitting the stored energy from the stored energy electronics to the nut coupler to move the coupler key to the unlocked position.

According to another aspect, the electromechanical actuating assembly further includes a damper assembly coupled to the nut and including a damper that provides a controlled rate of return of the output rod upon decoupling of the output rod from the motor.

According to another aspect, the damper assembly further includes a damper detent mechanism between the nut and the damper, the damper detent mechanism movable from an unlocked position in which the damper is uncoupled from the nut and a locked position in which the damper is coupled to the nut.

According to another aspect, the damper assembly further includes a latch mechanism that restricts movement of the nut in a fail-safe mode.

According to another aspect, the drive mechanism is configured to provide the following operations in sequence: (i) lock the damper detent mechanism; (ii) trigger an electrical switch to enable the damper; (iii) enable the latch mechanism that restricts movement of the nut in fail-safe mode; and (iv) decouple the nut from the output rod.

According to another aspect, the stored-energy electronics include a reset mechanism including a motor and a drive that reverses the sequence of operations of the drive mechanism.

According to another aspect of the present invention, an electromechanical actuating assembly includes a front screw coupled to a front nut that is axially movable relative to the front screw to control movement of an output rod, the front screw coupled to a motor through a motor drive train; a front nut coupler that selectively couples the front nut to the output rod to thereby control movement of the output rod with a motor and decouples the front nut from the output rod to thereby remove control of the output rod from the motor; a back screw coupled to a back nut that is axially movable relative to the back screw to control movement of the output rod, the back screw coupled to a motor though a motor drive train; a back nut coupler that selectively couples the back nut to the output rod to thereby control movement of the output rod with a motor and decouples the back nut from the output rod to thereby remove control of the output rod from the motor.

According to another aspect, the electromechanical actuating assembly further includes a motor for commonly driving the front screw and the back screw.

According to another aspect, the electromechanical actuating assembly further includes a first motor for driving the front screw and a second motor for driving the back screw.

According to another aspect, the front nut coupler and the back nut coupler are coupled to one another and to the output rod.

According to another aspect, the electromechanical actuating assembly further includes at least one extension arm connecting the back nut to the back nut coupler.

According to another aspect, the front nut coupler and the back nut coupler are contained within a housing.

According to another aspect, the front nut coupler includes one or more rollers for engaging one or more corresponding keys, the keys movable between a first position and a second position, wherein in the first position the rollers are disengaged from the keys to thereby disengage the front nut coupler from the front nut, and in the second position the rollers are engaged to the keys to thereby engage the front nut coupler with the front nut.

According to another aspect, the back nut coupler includes one or more rollers for engaging one or more corresponding keys, the keys movable between a first position and a second position, wherein in the first position the rollers are disengaged from the keys to thereby disengage the back nut coupler from the back nut, and in the second position the rollers are engaged to the keys to thereby engage the back nut coupler with the back nut.

According to another aspect the electromechanical actuating assembly further includes a dual stored energy device system including a first solenoid coupled to the front nut coupler and a second solenoid coupled to the back nut coupler, the dual stored energy device storing mechanical energy to decouple the front nut coupler and the front nut or to decouple the back nut coupler and the back nut, thereby to selectively control the output rod by only the front nut or by only the back nut.

The jam-tolerant electromechanical actuator can be used in aircraft (manned and unmanned), missiles, spacecraft, ships, submarines, unmanned underwater vehicles, military ground vehicles, and the like.

Further features of the invention will become apparent from the following detailed description when considered in conjunction with the drawings.

BRIEF DESCRIPTION OF THE DRAWINGS

FIG. 20 is a diagram illustrating an exemplary back ball nut coupler mechanism.

DETAILED DESCRIPTION

When used herein, "normal operation" or like phrases denote operation of the system during times generally excluding jam situations and testing situations. Testing situations may simulate both normal operation and jammed-mode operation. Further, "fail-safe" positions are positions taken by various elements when a jam of some sort is detected.

Figure 1:
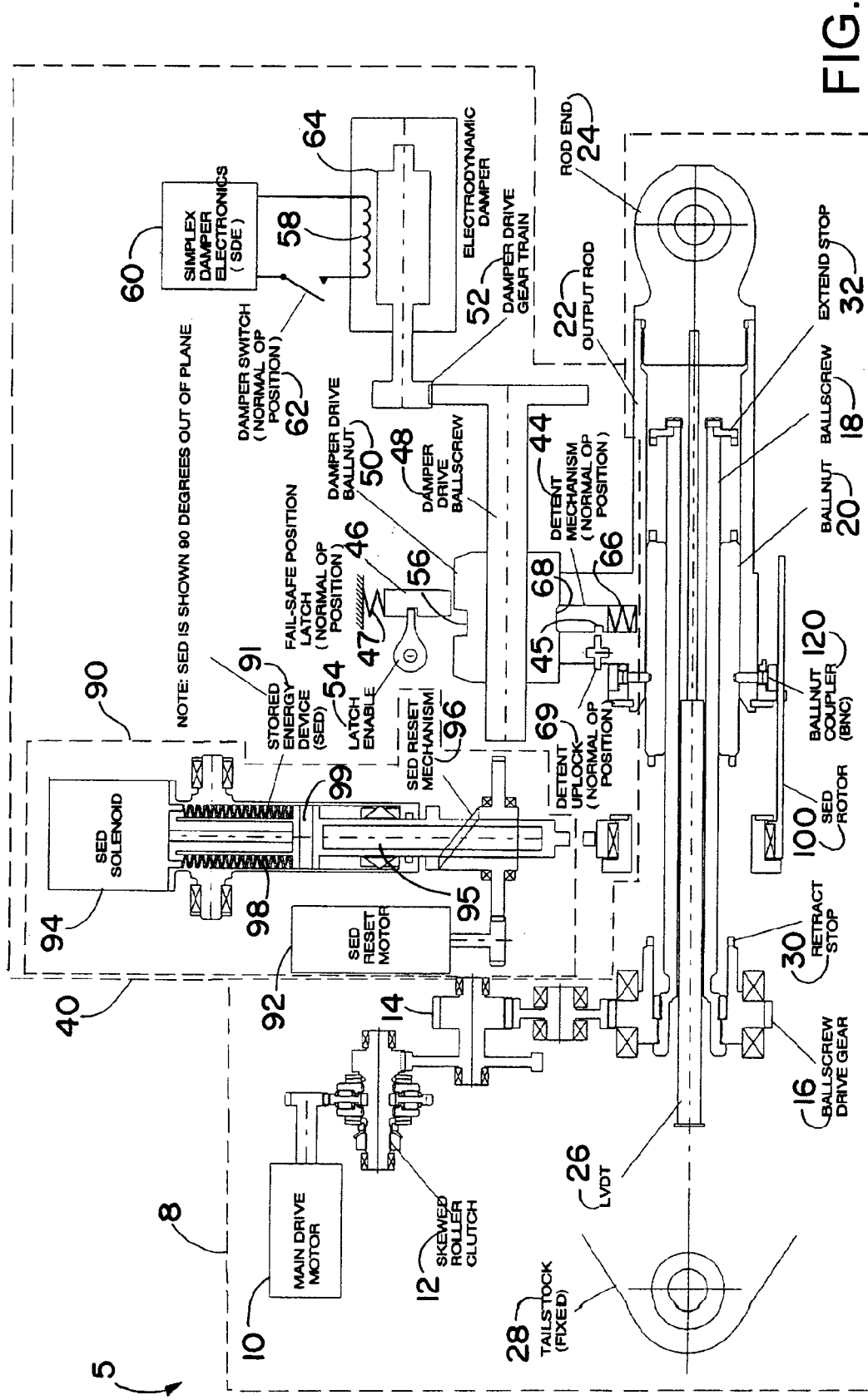
FIG. 1 is a schematic illustrating an exemplary Jam Tolerant Electromagnetic Actuator System.
Figure 2:
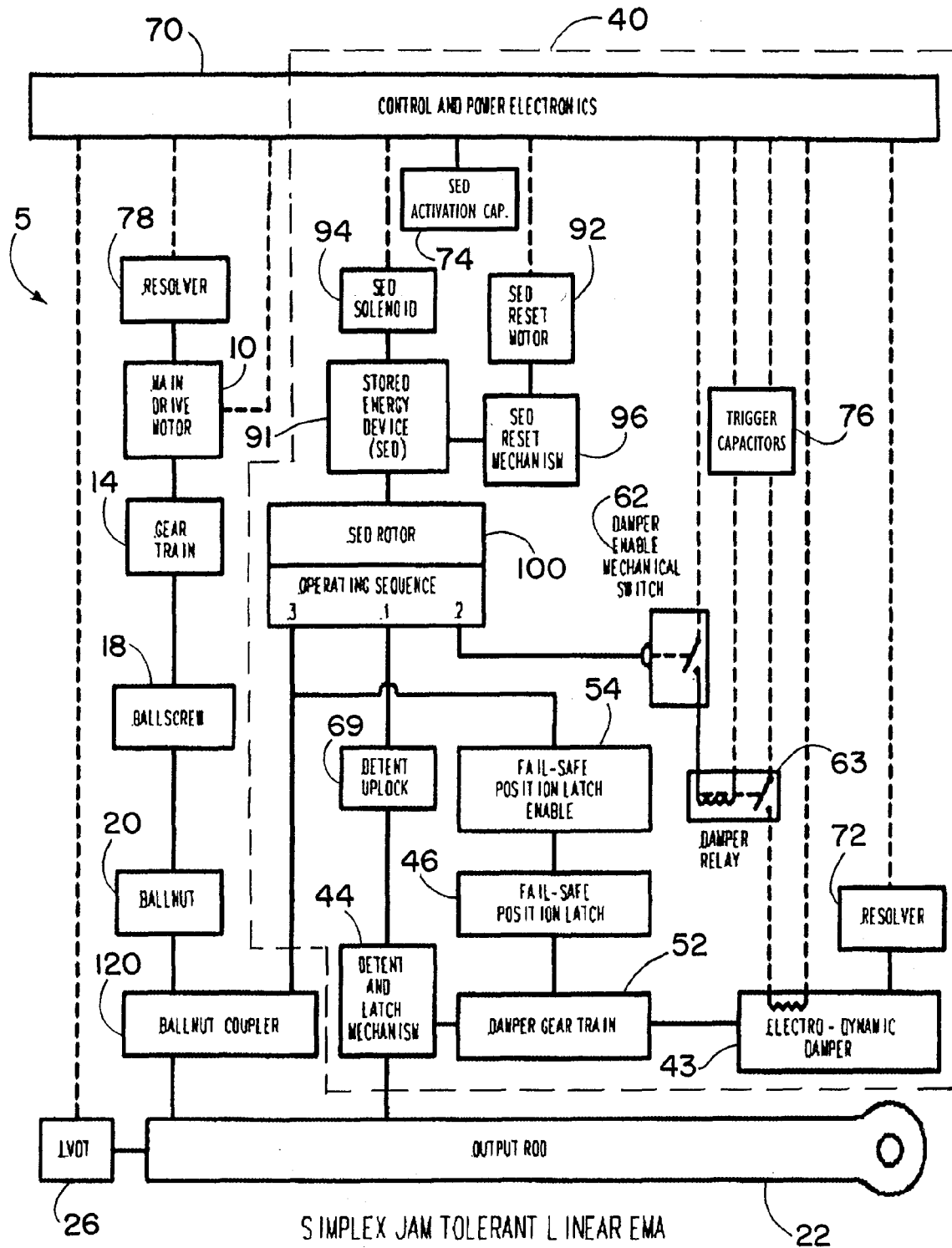
FIG. 2 is a block diagram illustrating an exemplary Jam Tolerant Electromagnetic Actuator System.
Figure 3:
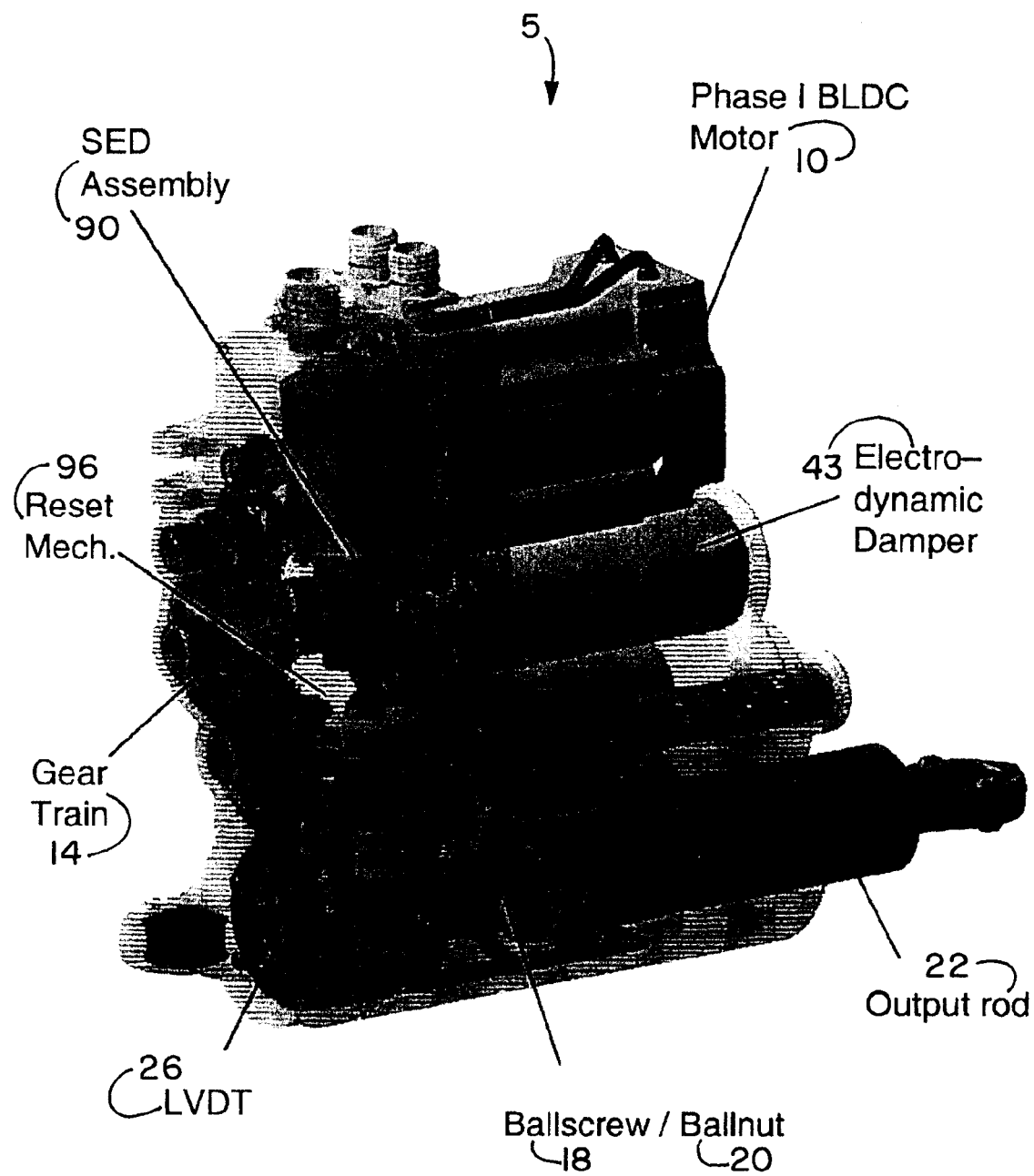
FIG. 3 is a diagram illustrating an exemplary Jam Tolerant Electromagnetic Actuator System.
Figure 4:
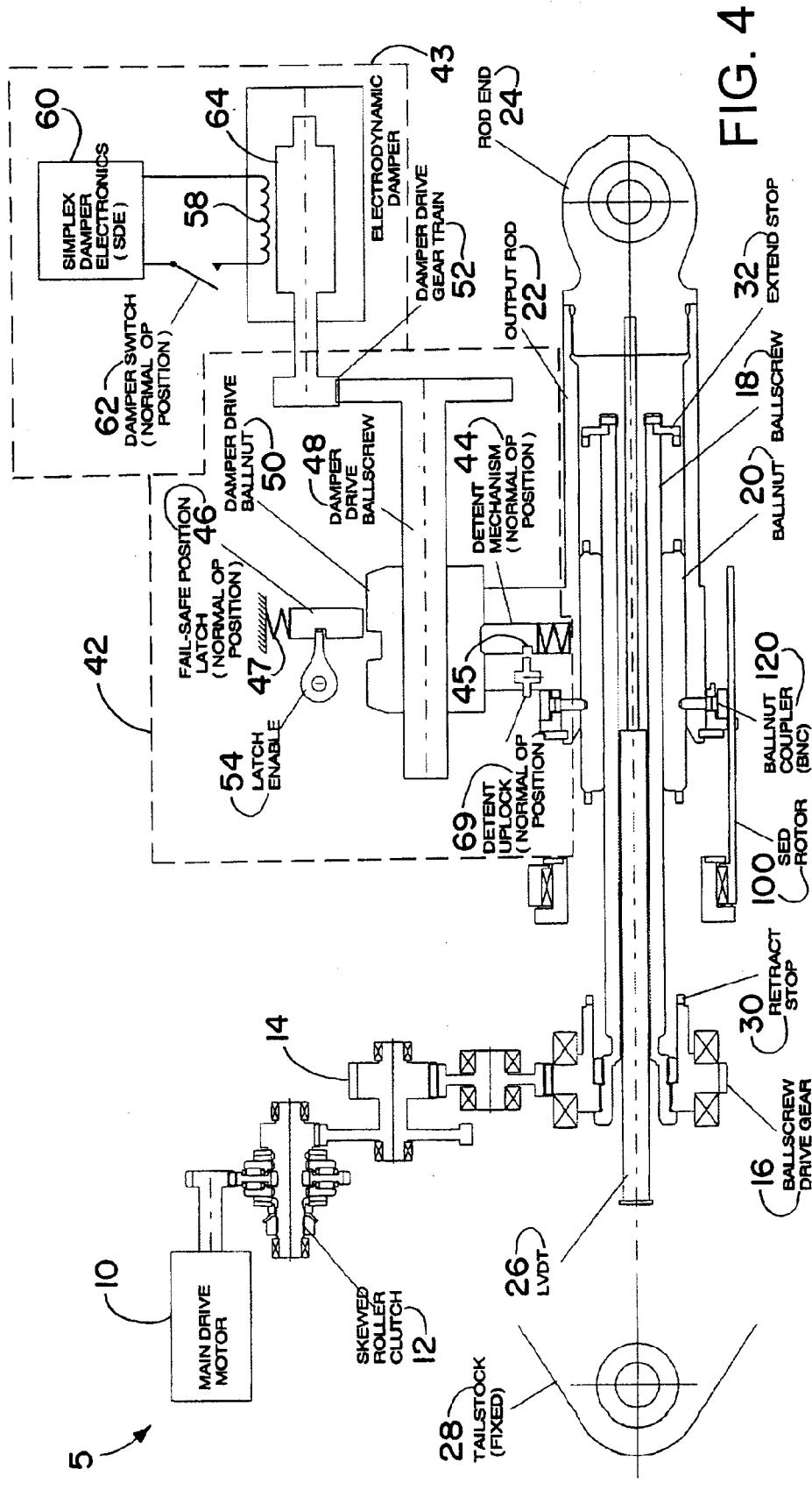
FIG. 4 is a schematic illustrating an exemplary Jam Tolerant Electromagnetic Actuator System during normal operation.
Figure 5:
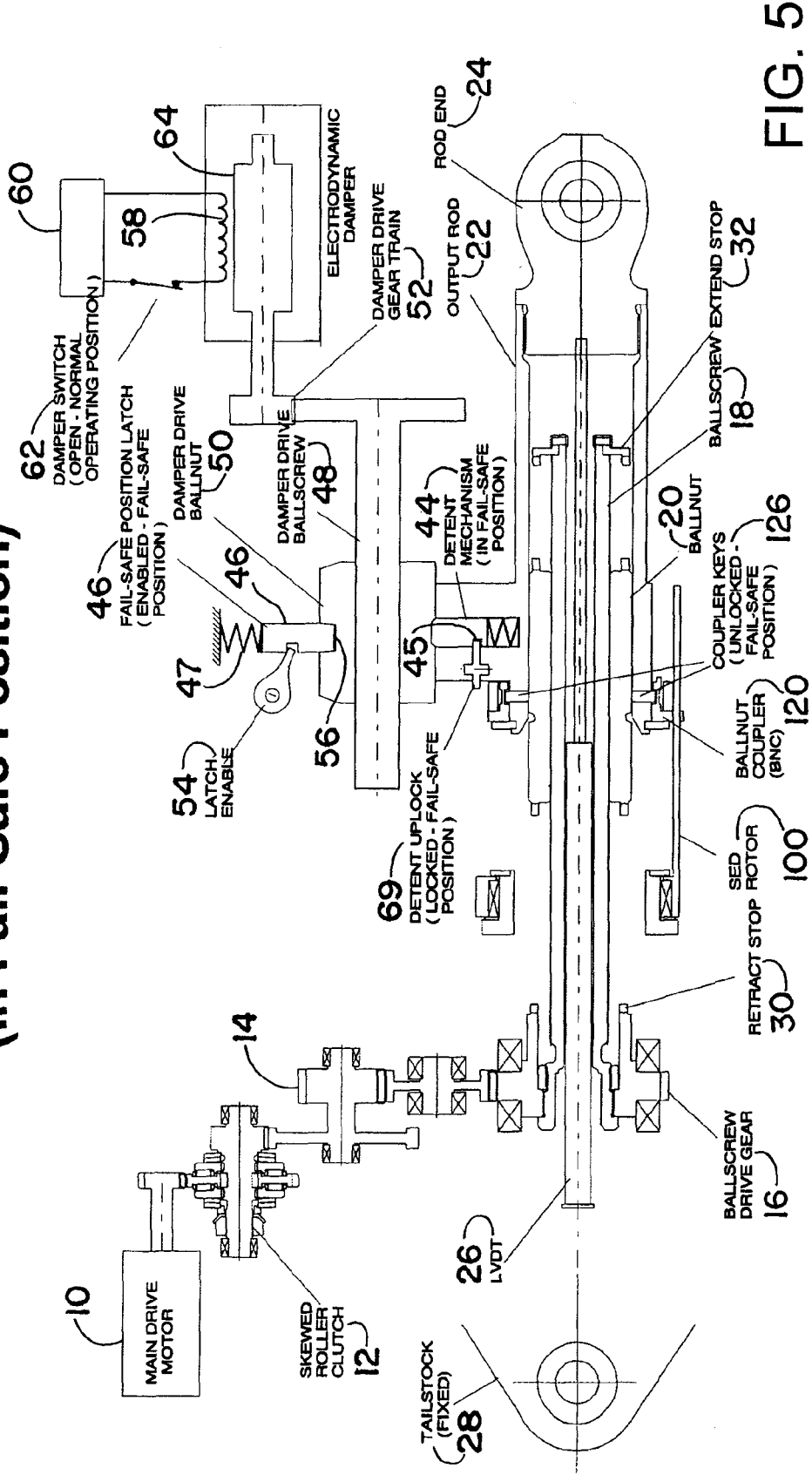
FIG. 5 is a schematic illustrating an exemplary Jam Tolerant Electromagnetic Actuator System during jammed operation.

Illustrated schematically in FIG. 1, operationally in FIG. 2 as a block diagram, and physically in FIG. 3 is a Jam-Tolerant Electromechanical Actuator (JTEMA) system 5 including a primary drive system 8 which may include a main drive motor 10, a clutch 12 (which may, e.g., be a skewed roller clutch), a drive gear train 14 rotationally coupling the drive motor 10 to the ball screw drive gear 16, which transfers power to a ball screw 18, that moves a ball nut 20, which effectuates the actuation of the output rod 22. The output rod 22 has a rod end 24 which is connected to the control surface (not shown) to be controlled by the JTEMA system 5. The rod end 24 may be connected to a measuring device, for example to one end of a linear variable differential transformer (LVDT) 26, which can measure the displacement of the rod end 24 with respect to a fixed location on the vehicle employing the JTEMA system 5 (e.g., on a fixed tailstock 28 that may also support the ball screw 18, or other elements of the JTEMA system 5). The movement of the output rod may be limited, for example, by physical stops. At full retraction, for instance, the output rod 22 may be limited by the ball nut 20 coming into contact with the retract stop 30. Conversely, at full extension, for instance, the output rod 22 may be limited by the ball nut 20 coming into contact with the extend stop 32.

The JTEMA system 5 may also contain a damper system 40 consisting of subsystems described in more detail below in the "Damper System" section. Further, the JTEMA system 5 may also be equipped with a Ball nut Disconnect System (BNDS) 80 and/or a dual ball nut disconnect system (DBNDS) 130, both of which are described in more detail below in their own respective sections.

Damper System

Referring now to FIGS. 1-5, the Damper System 40 consists of the following components which are described in detail in the following subsections: a Jam Tolerant Damper Drive (JTDD) 42, an Electro-Dynamic Damper (EDD) 43, a JTDD Detent Mechanism 44, and JTEMA Electronics 70.

Jam Tolerant Damper Drive (JTDD).

In flight, for example, great force may be exerted on a control surface due to aerodynamic drag. A jam in the primary drive system 8 may necessitate that the output rod 22 be decoupled from the primary drive system 8. In order to prevent fast and powerful movements and vibrations in the control surface after it is decoupled from the primary drive system 8, a damper 43 may be used to damp this movement. The JTDD 42 is used to couple the output rod 22 to this damper 43.

The JTDD 42 may consist of a JTDD detent mechanism 44 (described in more detail below), a fail-safe position latch 46, a damper-drive ball screw 48, a damper-drive ball nut 50, and a damper-drive gear train 52 connecting the output rod 22 to a damper 43 that can be, for example, the Electro-Dynamic Damper (EDD) 43.

Movement of the output rod 22 is transferred to the damper-drive ball nut 50 by, for example, direct coupling. The damper-drive ball nut 50 transfers this linear displacement into a rotational movement of the damper-drive ball screw 48. The damper-drive ball screw 48 is coupled (e.g., is fixedly attached) to the first gear in the damper-drive gear train 52, which transfers the rotational movement to the damper 43. The number of gears and the gear ratios in the damper-drive gear train 52 may be selected to best fit the particular installation and purpose of the JTEMA system 5, and may be chosen by one of ordinary skill in the art after reading and understanding this disclosure.

Although the damping helps to mitigate dangerous movements, it may be advantageous to completely halt the movement of a control surface in a particularly advantageous position. For example, it might be advantageous in some situations to lock an aileron in a position to provide maximum flight time or maximum flight distance, or minimum flight speed without stalling. In such cases, the fail-safe position latch 46 may be used to halt the movement of a control surface once the surface has been pushed to this position by external forces (for example, aerodynamic drag). The fail-safe position latch 46 is normally deactivated by being held in place in a disabled position by a latch disabler 54. When the latch disabler 54 is removed, the fail-safe position latch 46 is moved to an active position (by, e.g., a spring 47). Once in the active position, shown, for example, in FIGS. 5 and 7, the fail-safe position latch 46 passively latches and locks the control surface in the fail-safe position when it is driven there by aerodynamic forces acting on the surface. More specifically, the fail-safe position latch 46 may engage a depression 56 in the damper-drive ball nut 50 once the damper-drive ball nut 50 reaches a fail-safe position after being driven there by the output rod 22.

Electro-Dynamic Damper (EDD).

The EDD 43 may operate as a generator to convert the aerodynamic energy load of the disconnected flight surface into waste heat inside the damper windings 58 or electrical energy that may be stored in a suitable electrical storage device such as batteries (not shown) or capacitors 74, 76. The EDD 43 passively controls (damps) the rate of motion of the control surface as the surface returns to the fail-safe position when acted upon by, for example, aerodynamic forces. The EDD 43 may include, for example, damper windings 58, a simplex damper electronics (SDE) 60, a damper switch 62, and a damper relay 63.

The damper windings 58 may be, for example, a resisting wire used to convert mechanical movement into electrical current when used with one or more magnets 64 coupled to the last gear in the damper-drive gear train 52. These windings may also then dissipate electrical current energy into heat energy through inherent resistivity or external electrical resistors (not shown). The windings and/or resistors may be cooled by some sort of cooling system (not shown) known to one of ordinary skill in the art, may be exposed to ambient air or water flow, or may be contained in a closed housing (not shown).

The SDE 60 may be used to, for example, control the amount of damping, and may monitor, for example, the current and the heat generated in the damper 43. The SDE 60 may also control the flow of electrical current to various storage devices if these are being utilized.

The damper switch 62 is open during normal operation in order to prevent damping of the movement of the output rod 22 and control surface. If a jam of the primary drive system 8 is detected, the damper switch 62 is closed by the damper relay 63, completing the circuits in the EDD 43, which may now damp the movements of the output rod 22.

The Jam-Tolerant Damper Drive (JTDD) Detent Mechanism.

Figure 6:
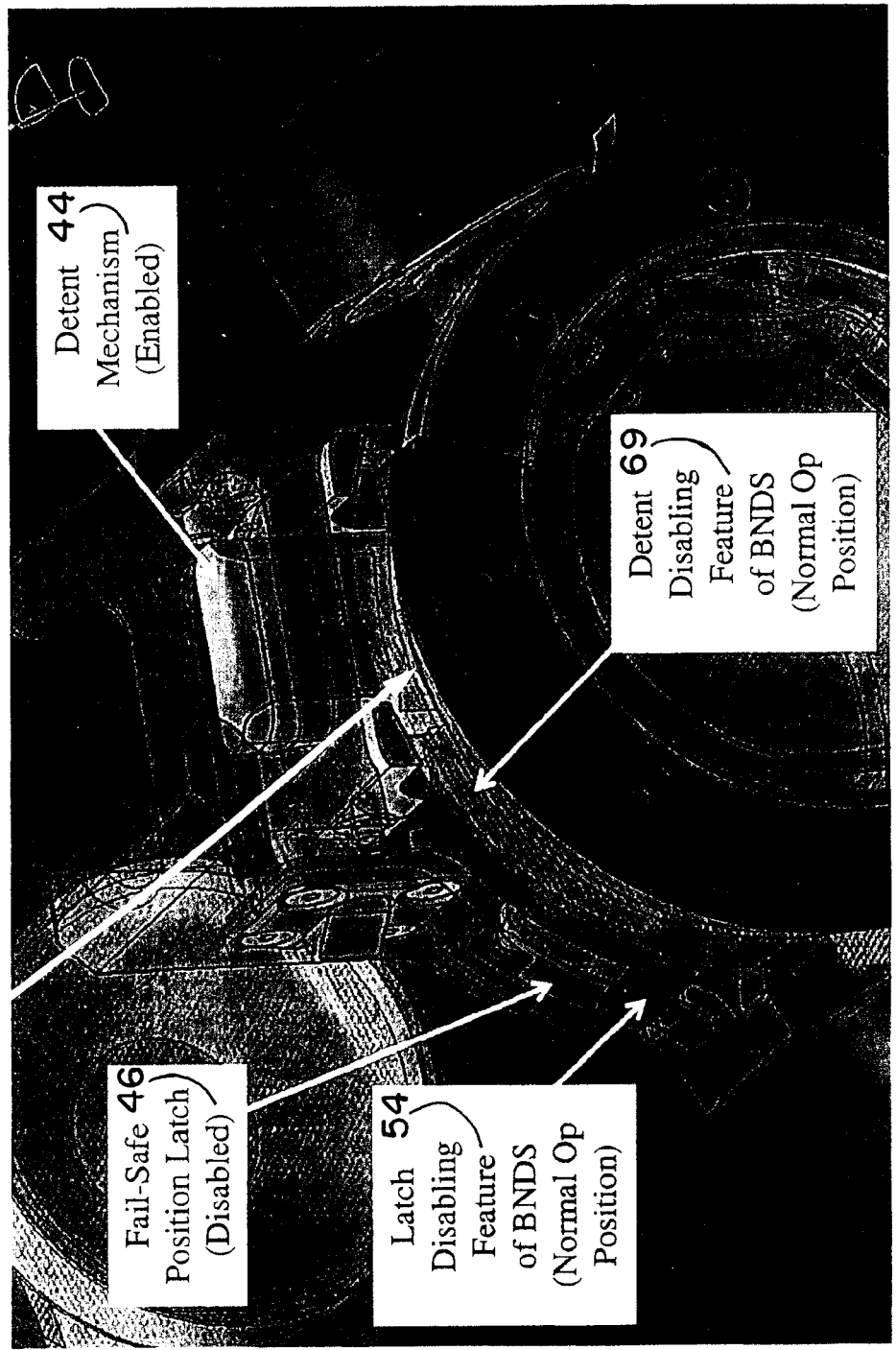
FIG. 6 is a diagram illustrating an exemplary damper drive detent mechanism during normal operation.
Figure 7:
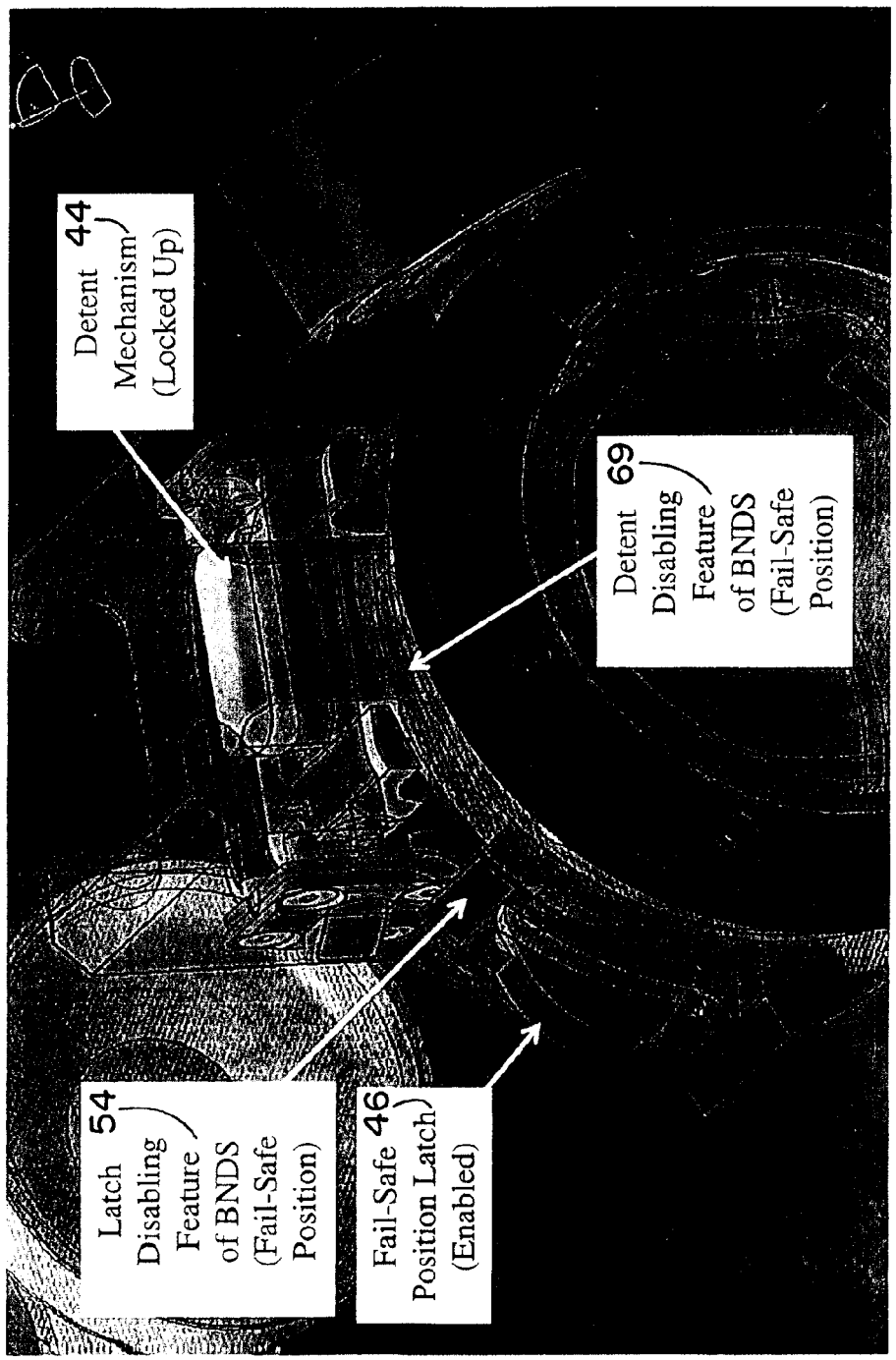
FIG. 7 is a diagram illustrating an exemplary damper drive detent mechanism during jammed operation.
Figure 8:
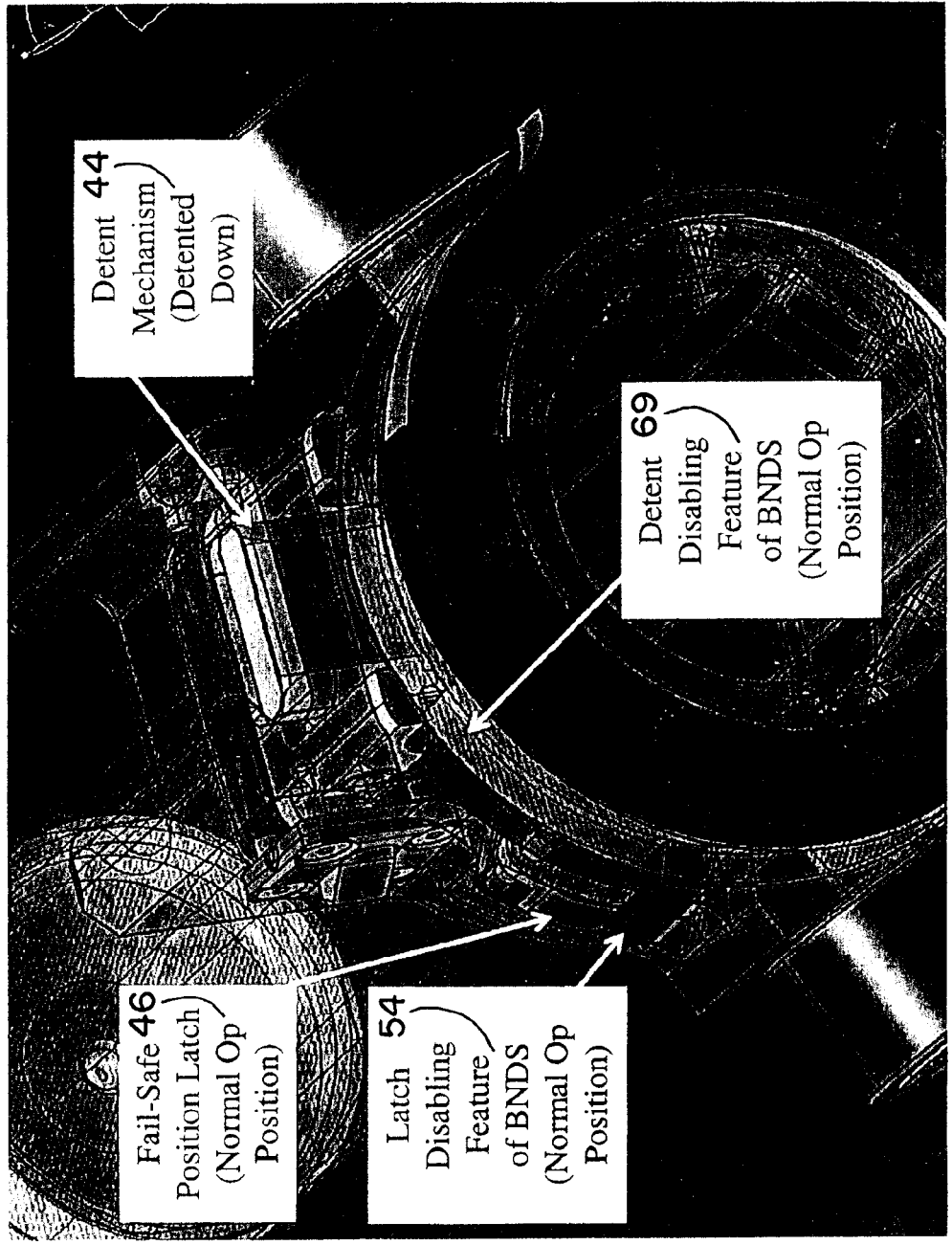
FIG. 8 is a diagram illustrating an exemplary damper drive detent mechanism during damper-jammed operation.
Figure 9:
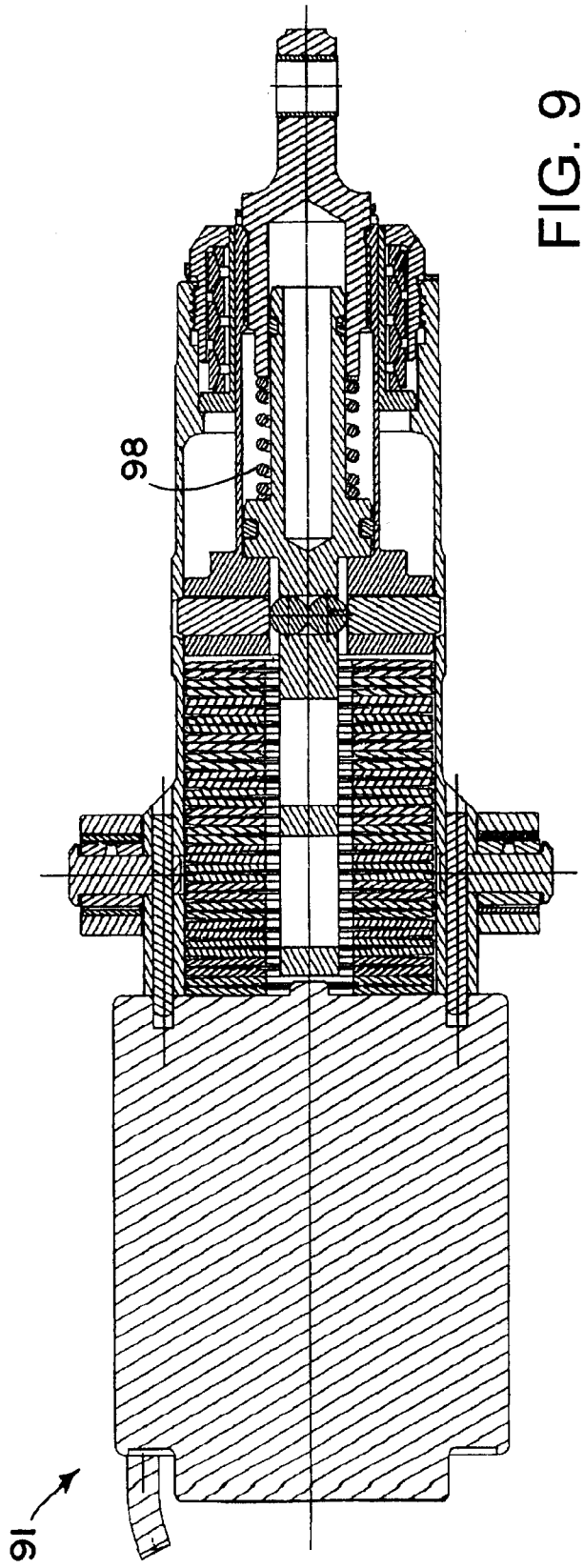
FIG. 9 is a diagram illustrating an exemplary stored energy device.
Figure 10:
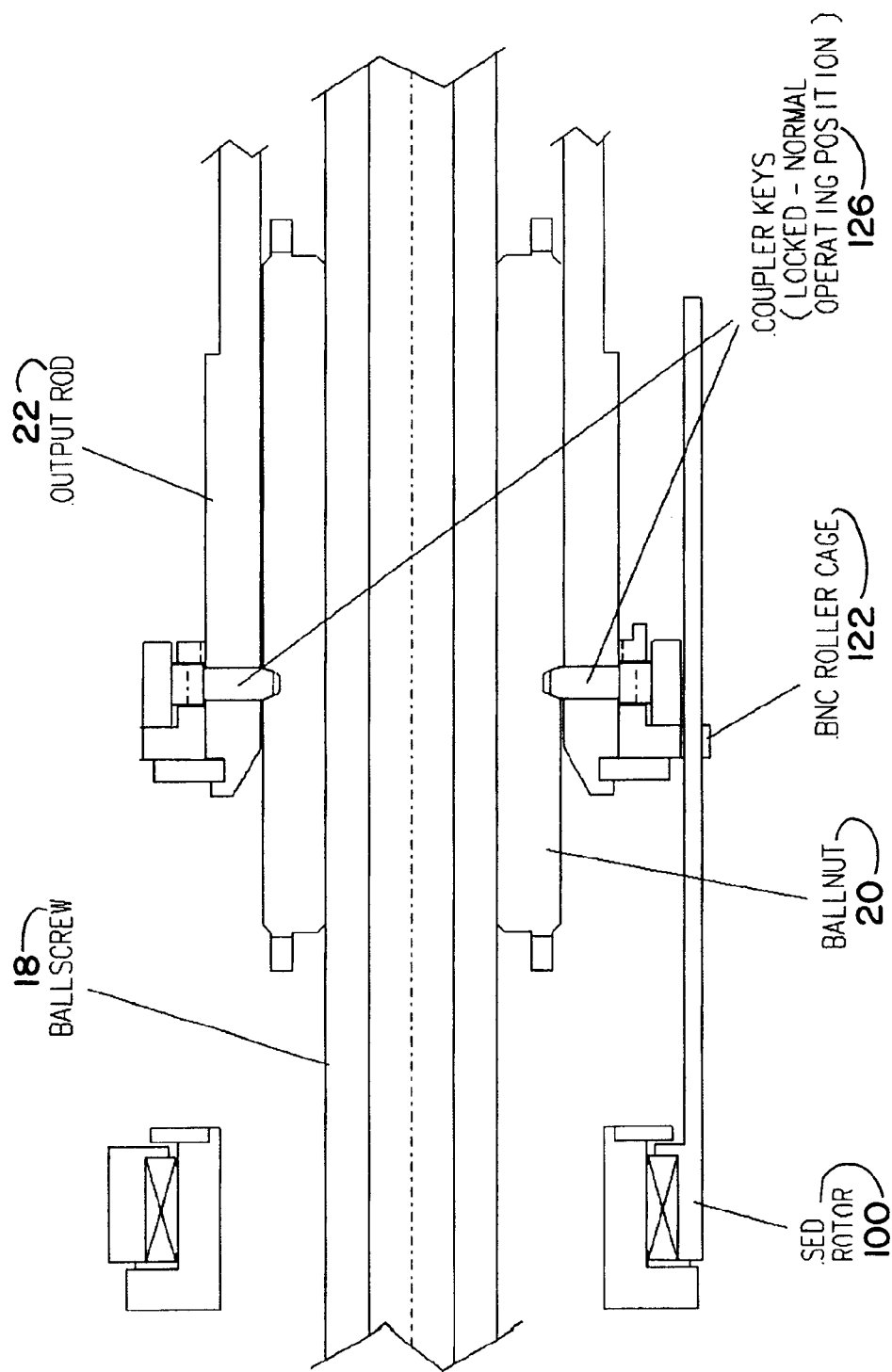
FIG. 10 is a diagram illustrating an exemplary Jam Tolerant Electromagnetic Actuator ball nut coupler during normal operation.
Figure 11:
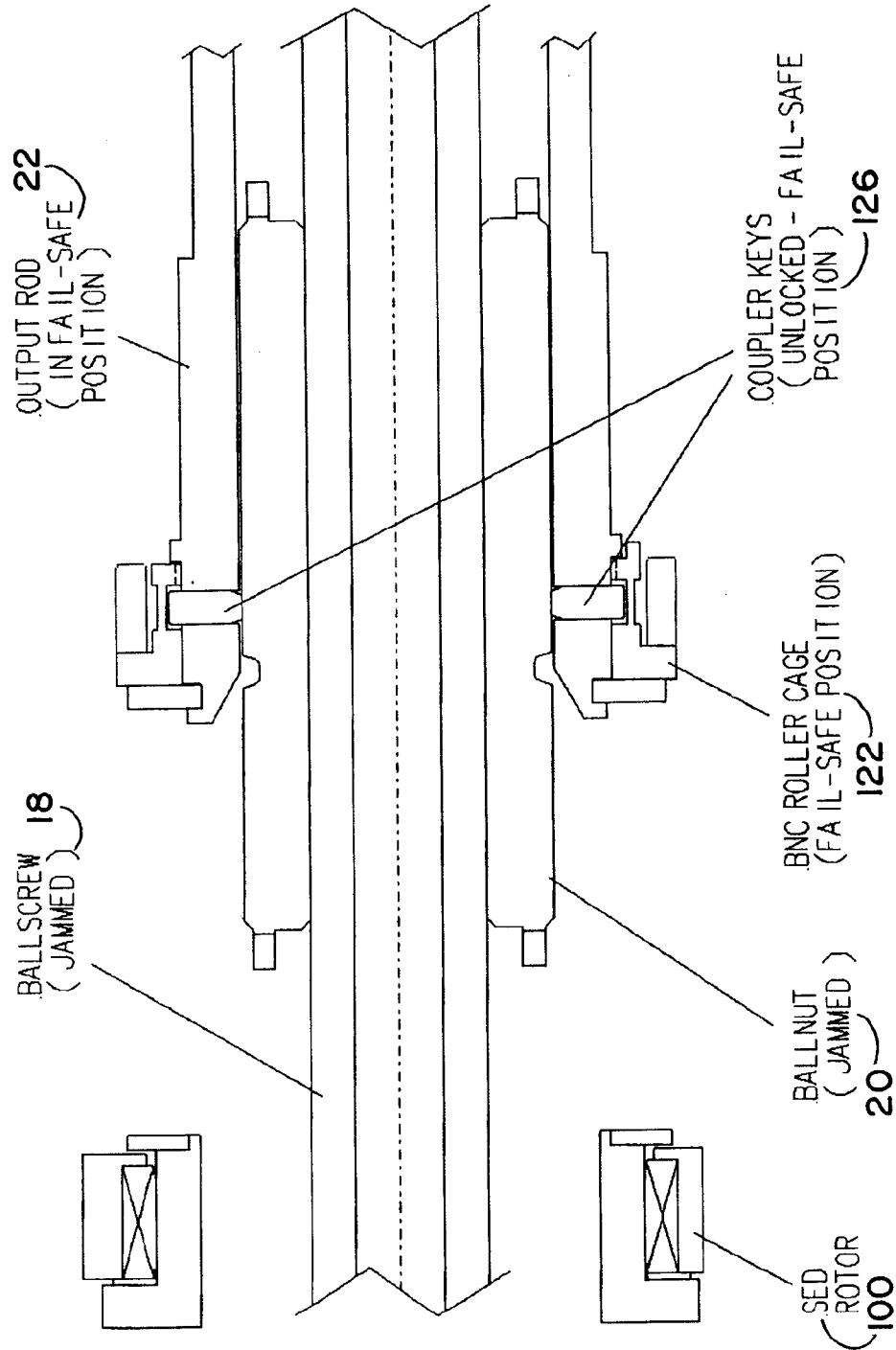
FIG. 11 is a diagram illustrating an exemplary Jam Tolerant Electromagnetic Actuator ball nut coupler during jammed operation.
Figure 12:
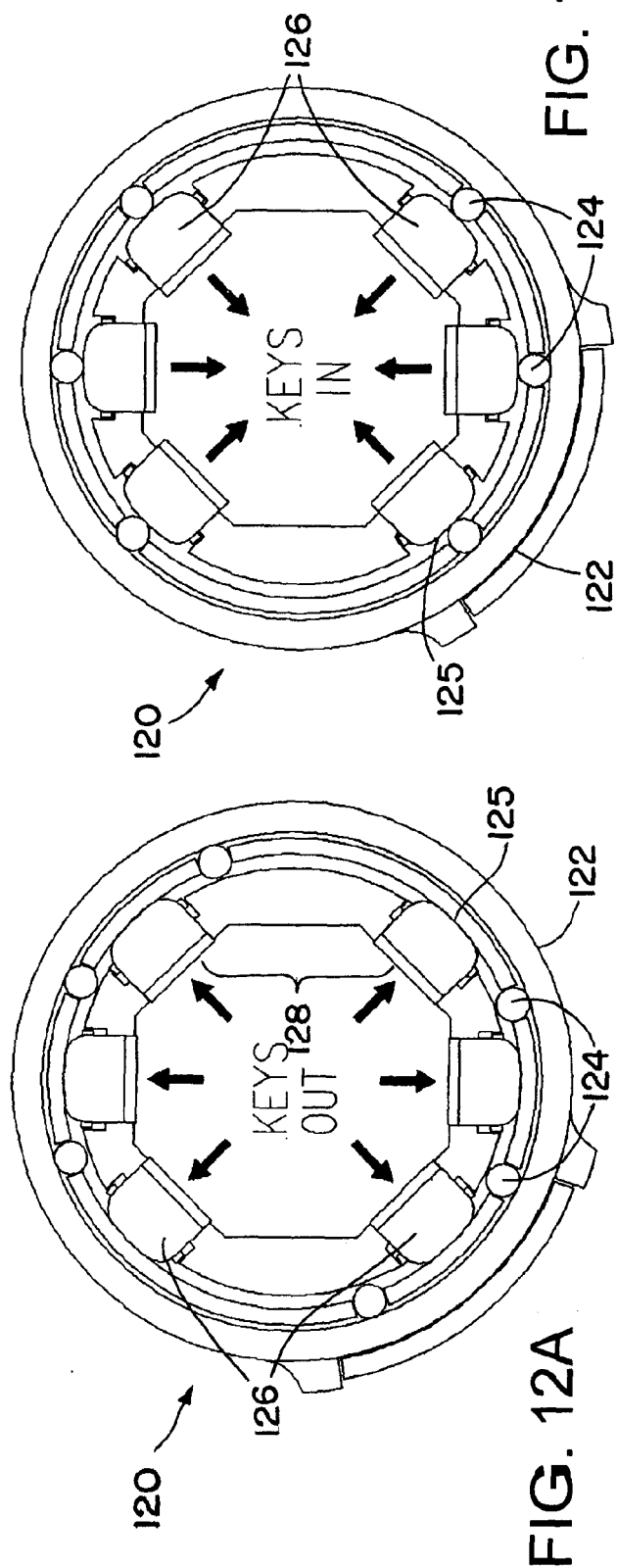
FIG. 12A is a diagram illustrating an exemplary Jam Tolerant Electromagnetic Actuator ball nut coupler during jammed operation.
FIG. 12B is a diagram illustrating an exemplary Jam Tolerant Electromagnetic Actuator ball nut coupler during normal operation.
Figure 13:
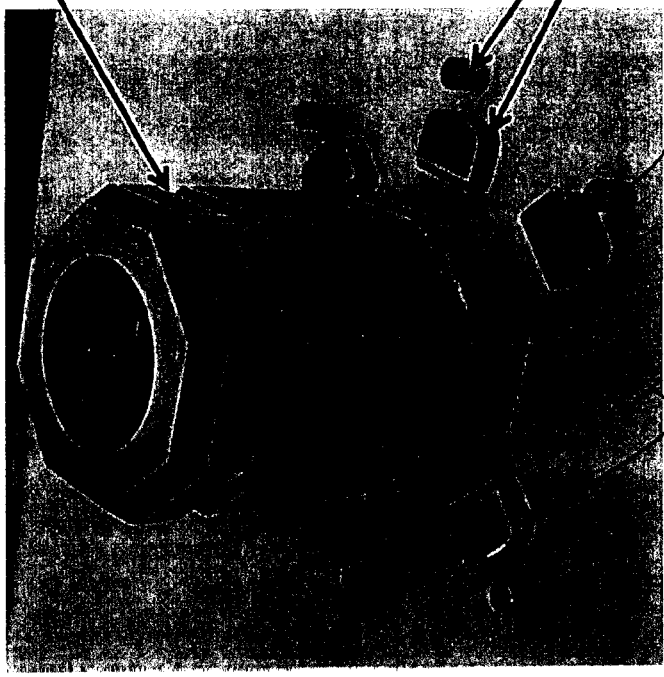
FIG. 13 is a diagram illustrating an exemplary Jam Tolerant Electromagnetic Actuator ball nut and corresponding keys and rollers.
Figure 14:
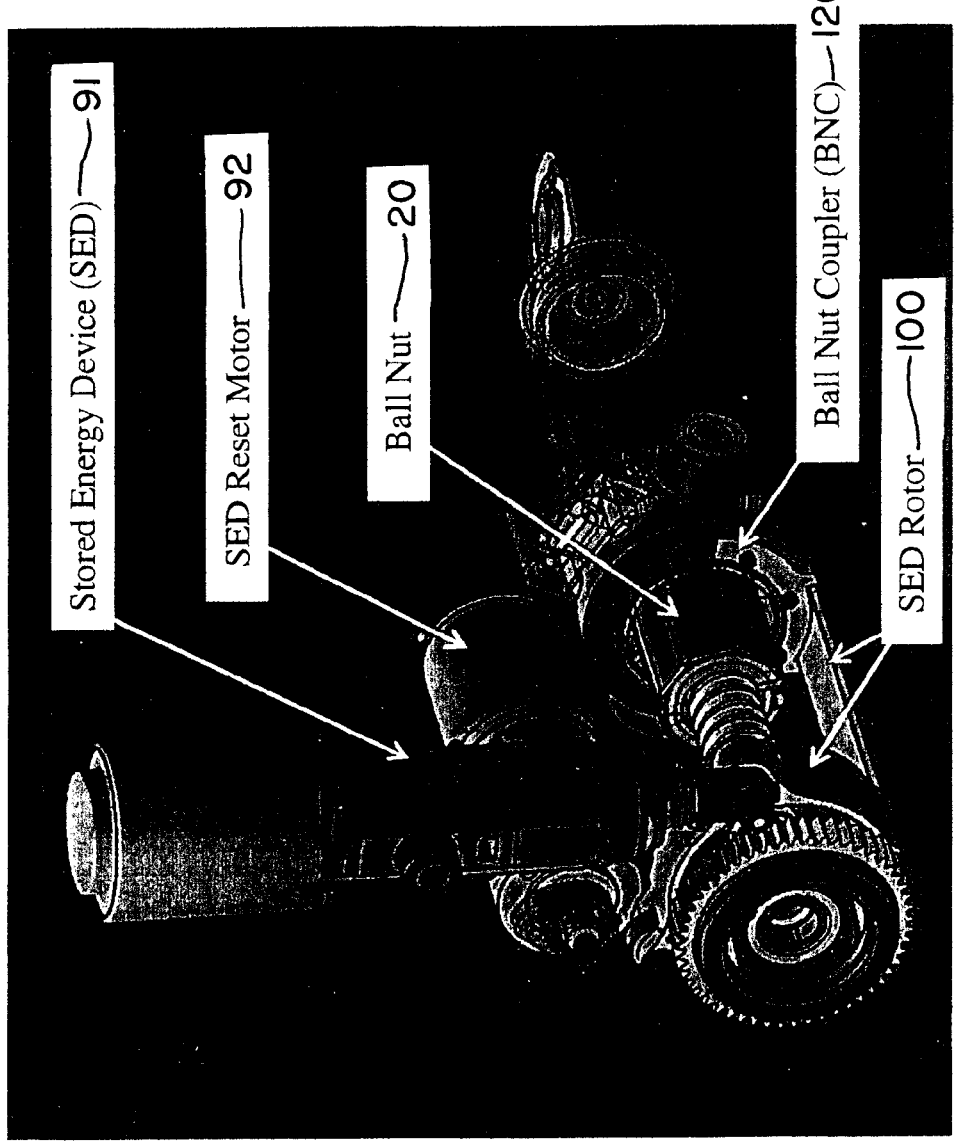
FIG. 14 is a diagram illustrating an exemplary ball nut disconnect system.
Figure 15:
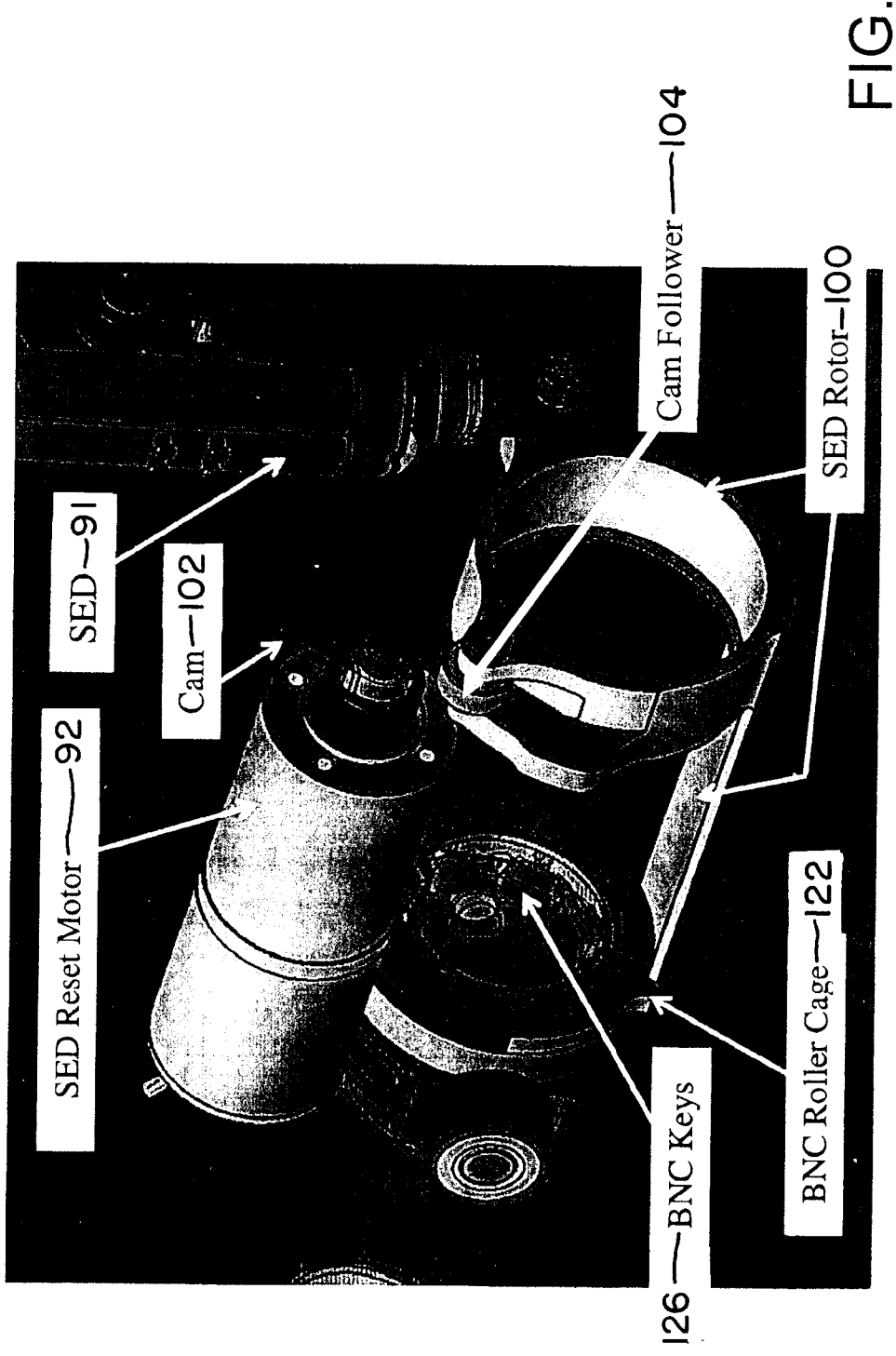
FIG. 15 is a diagram illustrating an exemplary ball nut disconnect system.

Referring now to FIGS. 6-8, the detent mechanism 44 provides jam tolerance for the JTDD 42.

The detent mechanism 44 may be attached to one or more detent springs 66 to effectuate the movement of the detent mechanism 44 into one or more detent recesses 68 in the damper-drive ball nut 50. During normal operation the only forces the JTDD 42 is required to carry are the loads required to accelerate the inertia of the JTDD 42, because the damping system 43 has not been engaged (e.g., the damper switch 62 has not been closed). The spring(s) 66 may be preloaded with enough stored energy to provide enough force to carry the inertial loads of the JTDD 42, thus ensuring that the damper 43 always remains indirectly coupled to the output rod 22. This connection enables the JTDD 42 to be quickly activated in the event that damping is required.

During jammed-mode operation—and as part of the ball nut disconnect sequence described further below—the first action that the Damper System 40 makes is to lock the detent mechanism 44 in the "drive" or "engaged" position using the detent uplock switch 69. The detent uplock switch 69 may be inserted into a notch or recess 45 in the detent mechanism 44. Locking the detent mechanism 44 in this position enables the JTDD 42 to carry the high damping loads associated with returning the control surface to the fail-safe position.

In addition to the possibility of a jam in the primary drive system 8, it is also possible for the JTDD 42 to jam. The JTDD 42 is jam tolerant, however, because the detent mechanism 44 passively disengages the Damper System 40 in the event of a jam in the Damper System 40, allowing the primary drive system 8 to continue its normal operation control functions. Disengagement occurs whenever the driving forces on the JTDD 42 are high enough to overcome the detent mechanism 44 spring 66 preload. This situation should only occur if there is a malfunction (such as a jam or excessive friction drag) within the JTDD 42. The disengagement of the Damper System 40 is detected by a continuous monitor in the JTEMA electronics 70 which will create a Damper INOP fault message.

The JTEMA system 5 can automatically test and reset these jam-tolerant features of the Damper System 40 during an on-the-ground test.

JTEMA Electronics.

Referring back to FIG. 2, the EMAS 5 may be equipped with JTEMA electronics 70 configured to, for example, control and monitor the Damper System 40.

During normal operation the JTEMA electronics 70 provide continuous monitoring of the damper resolver 72. This monitoring enables continuous detection of a damper-drive jam that causes the Damper System 40 to detent free of the primary drive system 8. The damper resolver 72 may be any type of sensor, but is preferably a rotational sensor. In a preferred embodiment the damper resolver 72 is an analog resolver. In another preferred embodiment, the damper resolver is a digital encoder. Under normal conditions, there should be a constant gear ratio between the damper resolver 72 and the LVDT 26, within a tolerance band dependent on the specific configuration of the JTEMA system 5 and the vehicle or device the JTEMA system 5 is installed in. If this gear ratio tolerance band is exceeded, the JTEMA electronics 70 may create a fault message.

During all operations, the JTEMA electronics 70 may provide continuous monitoring of the main drive motor 10 via a main drive resolver 78. The main drive resolver 78 may monitor the motor current, speed, torque, position, and the like. The main drive resolver 78 may be an analog resolver or any other individual sensor or suite of sensors known in the art to monitor the main drive motor 10.

During normal operation the JTEMA electronics 70 also provide continuous monitoring of the energy storage capacitors used to provide energy during an electrical failure. Both the Stored Energy Device (SED) 91 activation capacitors 74 and the damper switch 62 trigger capacitors 76 should be kept charged at all times to ensure immediate energy availability upon loss of system electrical power. A fault message is created by the JTEMA electronics 70 any time these capacitor sets lose their charge during operation.

Upon loss of system power, the JTEMA electronics 70 uses stored electrical energy in the activation capacitors 74 to activate the SED 91 which enables the Damper System 40 prior to disconnecting the ball nut 20. The JTEMA electronics 70 uses stored electrical energy from the trigger capacitors 76 to close the damper switch 62 with the damper relay 63, thus closing the damper 43 circuits after the SED 91 triggers the damper detent uplock switch 69.

During ground tests, the JTEMA electronics 70 automatically run the Damper System 40 performance tests. These tests may include, for example driving and stopping the SED reset motor 92 at the position where the main drive motor 10 can be run while the Damper System 40 is activated. The Damper System 40 performance may be verified by measuring the main drive motor 10 current at a given main drive motor 10 speed. If the main drive motor 10 current is below an allowable threshold a Damper System 40 performance fault message will be created. The current falling below a certain value would indicate that the activated Damper System 40 is not sufficiently restricting the movement of the output rod 22 (moving under the power of the main drive motor 10 in this testing mode).

During ground tests, the JTEMA electronics 70 may measure the time from SED solenoid 94 command until the damper switch 62 is closed. If this time is longer than the allowable time, the JTEMA electronics creates a SED 91 performance fault message.

During ground tests, the JTEMA electronics 70 may automatically run the damper detent mechanism 44 performance test by driving the main drive motor 10 while the Damper System 40 is activated but the detent mechanism 44 is not locked up by the detent uplock switch 69 to verify that the detent mechanism 44 will disconnect from the damper-drive ball nut 50 at loads above the normal operating loads. These loads may be verified by main drive motor 10 current draw at a speed which would create a Damper System 40 load above a threshold value, or by a separate sensor known in the art that may measure the force directly or indirectly. If the detent mechanism 44 fails to disconnect the Damper System 40 from the primary drive system 8, a damper detent mechanism 44 performance fault message will be created. Following a successful completion of this test, the JTEMA Electronics 70 may automatically run the damper detent mechanism 44 reset sequence described more fully below.

Ball Nut Disconnect System (BNDS)

Referring now to FIGS. 9-15, the BNDS 80 consists of the following principal components which are described in detail in the following sections: Stored Energy Device System (SEDS) 90, and Stored Energy Electronics 110.

Stored Energy Device System (SEDS).

The SEDS 90 consists of the Stored Energy Device (SED) 91 (a preferred embodiment is shown in detail in FIG. 9), the SED drive mechanism 95, and the SED reset mechanism 96 which are described herein.

Upon loss of electrical power, the JTEMA electronics 70 automatically provides stored electrical energy to the SED solenoid 94 which releases stored energy (e.g., mechanical spring energy) in the SED 91 to provide input motion and torque via the SED drive mechanism 95 to the BNC 120 to disconnect the ball nut 20 from the output rod 22. The SED 91 may include a compressed mechanical or gas spring 98 and a solenoid-operated release mechanism 99.

The SED drive mechanism 95 may be a mechanical drive train between the SED 91 and the Ball Nut Coupler 120 (BNC). In addition to transmitting the stored energy from the SED 91 to the BNC 120, the SED drive mechanism 95 performs the following operations in sequence:

Step 1: Disable (lock) the damper detent mechanism 44 (Refer to the detent uplock switch 69 in FIGS. 4 and 13).

Step 2: Trigger the damper switch 62 to enable the damper 43 (Refer to the damper switch 62 in FIG. 4).

Step 3: Enable the fail-safe latch 46 (Refer to the latch disabler 54 feature in FIGS. 4 and 13).

Step 4: Decouple (disconnect) the ball nut 20 from the output rod 22 and control surface (Refer to FIGS. 4, 6 and 7).

These operations may be reset by the SED reset mechanism 96. The SED reset mechanism 96 may include a SED reset motor 92 (which may include, e.g., some type of electric motor and a mechanical drive) which provides the motion and force required to reverse the sequence of operations described above by rotating the SED rotor 100 back to the normal operating position while the vehicle or device is not in full operation (e.g., the aircraft is on the ground). The JTEMA electronics 70 may drive the primary drive system 8 to align the ball nut 20 with the BNC 120 in the output rod 22. The SED reset motor 92 may compress the linear SED springs 98 (or, if the SED 91 is a rotary mechanism, rewinds the SED torsion spring 98) to reset the SED 91. The SED reset mechanism 96 may reset and disable (lock) the fail-safe latch 46 by, for example, covering it with the latch disabler 54. The damper switch 62 may be released to disable the damper 43. The SED reset mechanism may withdraw the detent uplock switch 69 to enable (unlock) the damper detent mechanism 44. Finally, the ball nut 20 may be reconnected to the output rod 22 with the following part motions: the SED motor reset cam 102 rotates the SED rotor 100 via the cam follower 104 (See FIG. 11), rotation of the SED rotor 100 rotates the BNC roller cage 122 (See FIG. 11), rotation of the BNC roller cage 122 drives the rollers 124 on top of the outside surface 125 of BNC keys 126 which force the keys 126 radially inward to engage the slots 128 in the ball nut 20 (See FIGS. 12A and 12B). The keys 126 may be any appropriate shape including substantially square, rectangular, or trapezoidal, for example. Preferably, the keys have rounded or angled edges to ease and smooth the path of the rollers 124 when rolling onto the surface 125 of the keys 126.

Stored Energy Electronics.

A portion of the JTEMA electronics 70 may be dedicated to providing sequenced operations in controlling the Ball Nut Disconnect System 80 (BNDS):

During a system power up time, the JTEMA electronics 70 may automatically align the ball nut 20 with the output rod 22 by driving the primary drive system 8. Then, the JTEMA electronics 70 may drive the SED reset motor 92 to engage (mechanically connect) the ball nut 20 with the output rod 22 and to reset the Stored Energy Device (SED) 91. Also during system power up, the JTMEA electronics 70 may store electrical energy in the SED activation capacitors 74.

During system power down (e.g., when power is disconnected from the JTEMA system 5), the JTEMA electronics 70 automatically releases stored electrical energy to activate the SED solenoid 94 in the SED 91. (Refer to the schematic portion of FIG. 2).

Dual Ball Nut Disconnect System (DBNDS):

Referring now to FIGS. 16-20, the DBNDS 130 consists of the following principal components which are described in detail in the following sections: Dual Jam Tolerant Electronics (DJTE) 140, Dual Stored Energy Device System (DSEDS) 160, and Dual Ball Nut Coupler (DBNC) 180. In these sections a "prime" notation is used to denote features associated with a first or a front element while a "double prime" notation is used to denote features associated with a second or a back element. Where a feature or element is identical to a feature or element already described, sometimes the "prime" notation is omitted for clarity.

Dual Jam Tolerant Electronics (DJTE).

In operation (e.g., in flight), the DJTE 140 evaluates load sensor data (which may come, e.g., from the LVDT 26) and main drive motor data (which may come, e.g., from the main drive resolver 78) to detect and then isolate a jam in a first primary drive system 8. The DJTE 140 may then command the appropriate dual stored energy device solenoid 162 to disconnect the jammed primary drive system from the output rod 22, and control the first or a second primary drive system 8 in order to facilitate jam recovery and maintain command of the control surface.

After operations of the vehicle are completed (e.g., the aircraft is on the ground), the DJTE 140 commands the SED reset motor 92 (which may be, for example, a servo motor, a stepper motor, or the like) to re-energize the SED 91 and functions as a component of the JTEMA electronics' 70 automatic self-test system as described above in regards to the BNDS 80.

The DJTE 140 may be a part of JTEMA electronics 70, or may be a separate system.

Dual Stored Energy Device System (DSEDS).

Figure 16:
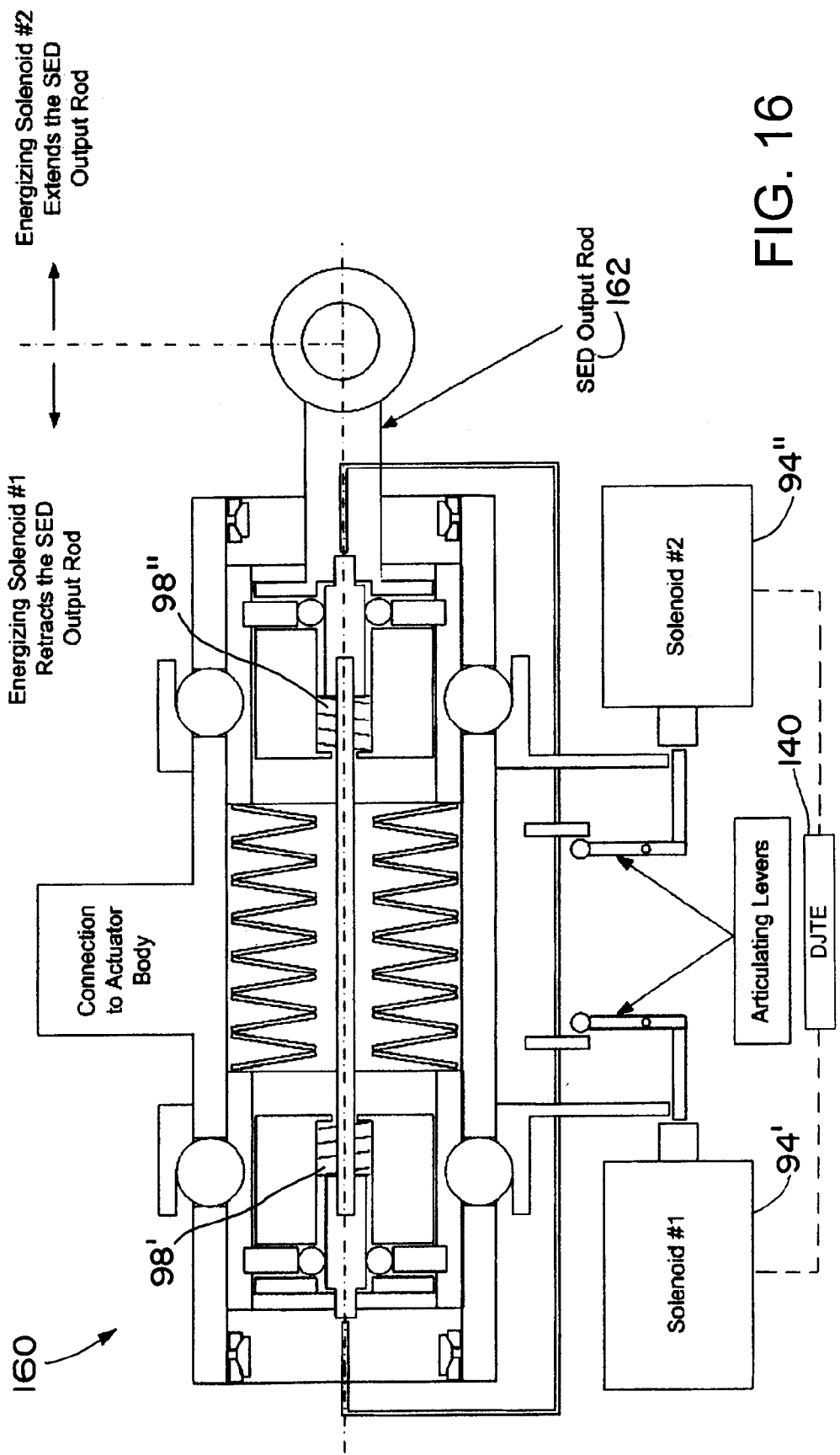
FIG. 16 is a schematic illustrating an exemplary dual stored energy device.

Referring now to FIG. 16, shown is a diagram of a DSEDS 160. The DSEDS 160 is similar to the SEDS 90 (described above) except that it uses two solenoids 94', 94" (one for each BNC 120 system), a single output rod 22 either extends or retracts from a neutral position depending upon which ball nut 20', 20" is to be disconnected from the output rod 22. Further, the DSEDS 160 also uses an energy absorbing device 98', 98" (such as a stack of ringfeder springs) at each end of the SED output 162 stroke.

The DSEDS 160 stores sufficient mechanical energy to drive and decouple either of the ball nuts 20', 20" while the JTEMA system 5 is loaded up to stall load, and releases the stored mechanical energy (spring energy) and transmits the energy to one side of the Dual Ball Nut Coupler (DBNC) 180 to rotate the roller cage 122.

Dual Ball Nut Coupler (DBNC).

Figure 17:
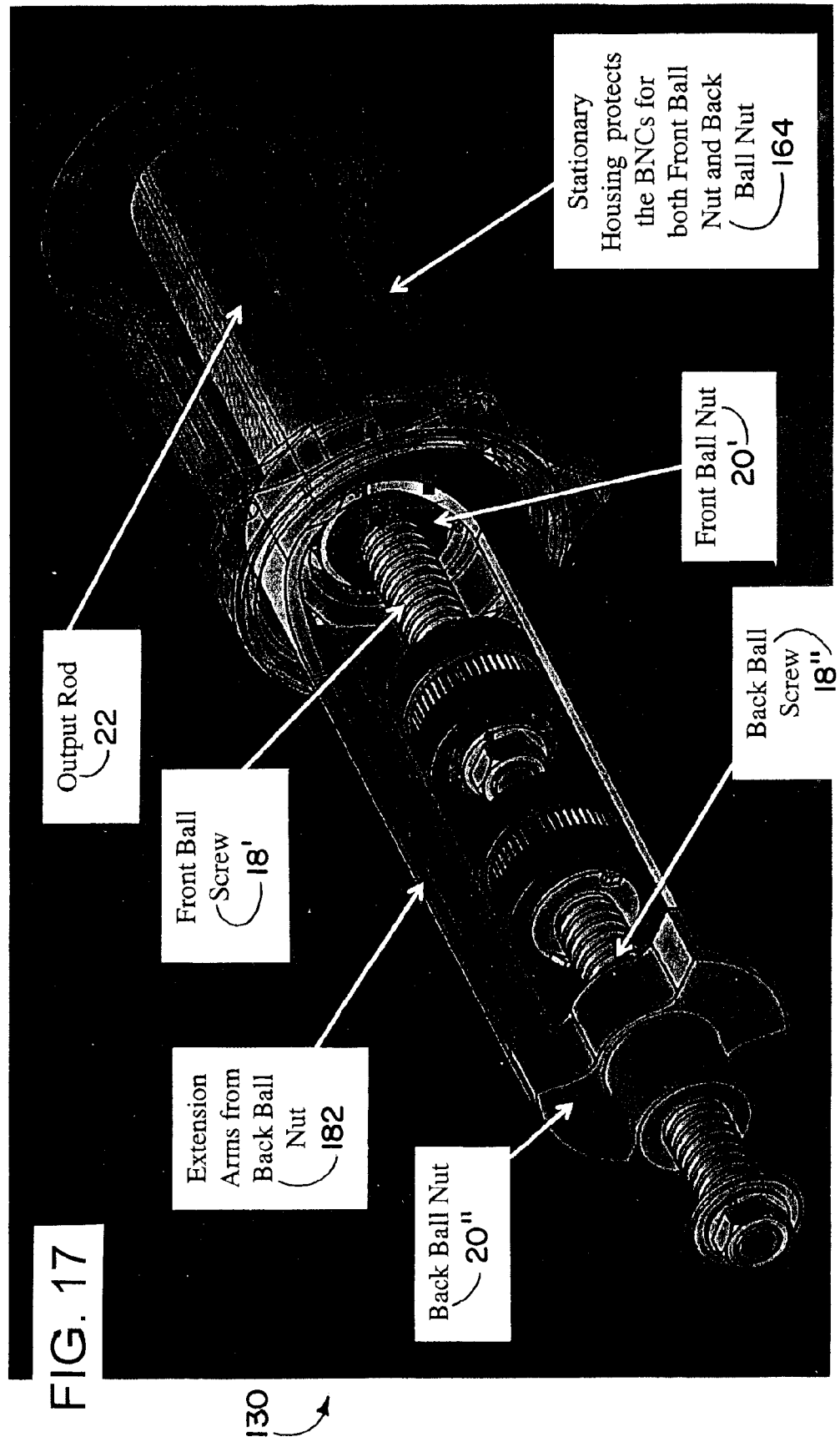
FIG. 17 is a diagram illustrating an exemplary dual ball nut disconnect system.
Figure 18:
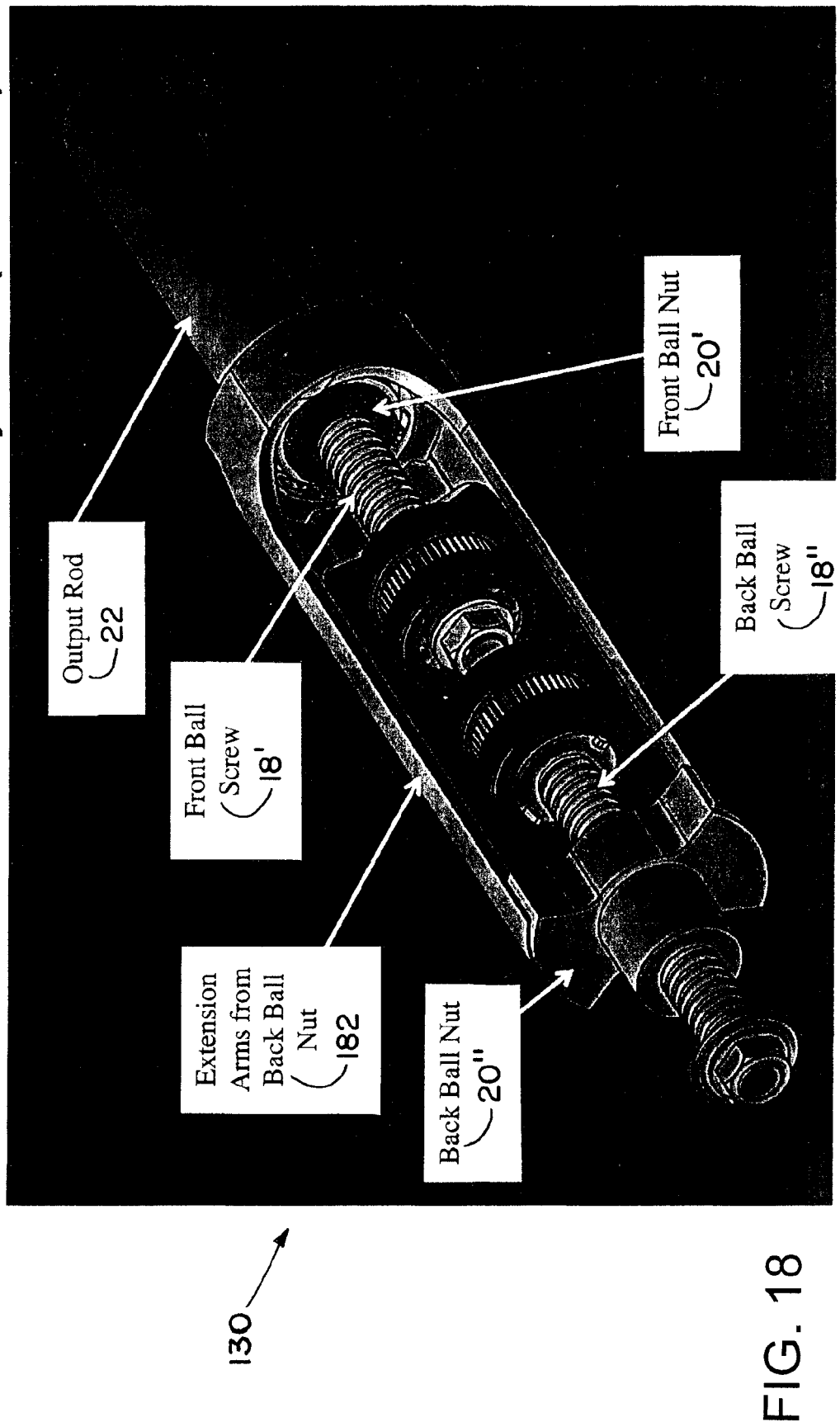
FIG. 18 is a diagram illustrating an exemplary dual ball nut disconnect system.
Figure 19:
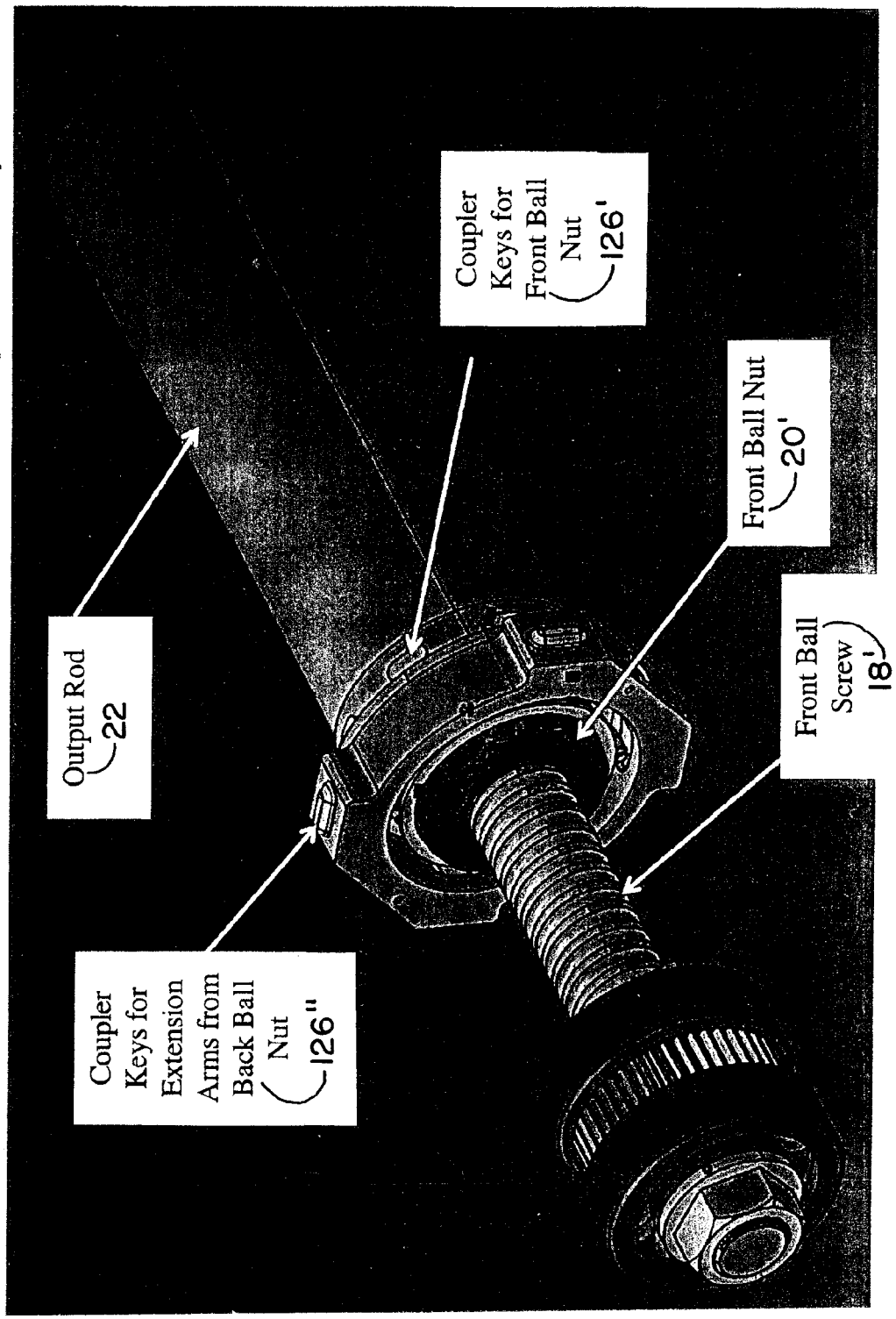
FIG. 19 is a diagram illustrating an exemplary dual ball nut disconnect system.

Referring now to FIGS. 17, 18 and 19, shown is a Dual Ball Nut Coupler (DBNC) 180. The DBNC 180 disconnects one or the other of the ball nuts 20', 20" (but not both) from the output rod 22, and reconnects the disconnected ball nut 20' 20" to the output rod 22 during on-the-ground automatic self-testing/reset procedures. The DBNC 180 enables a minimally-armored but fully protected architecture of a dual ballistic tolerant JTEMA by, for example, requiring only one armored housing unit to protect only one actuator system that provides similar redundancy to a system having two separate JTEMAs. Note in FIG. 17 that the stationary housing 164 protects the ball nut couplers 120', 120" for both the front ball nut 20' and the back ball nut 20"'.

The DBNC 180 may include a front ball nut coupler 120'. The front BNC 120' is identical to the JTLEMA Simplex BNC 120 shown in FIGS. 10, 11, 12A and 12B. To engage the front BNC 120', the roller cage 122 and rollers 124 are rotated to the outside surfaces 125 of the BNC keys 126 in order to drive the keys inward into the slots 128 of the front ball nut 20'. During normal operation the front BNC keys 126 are held inward to keep the front ball nut 20' connected to the output rod 22. When the front ball nut 20' is to be disconnected, the BNC keys 126 are driven out when the roller cage 122 and rollers 124 are rotated off the outside surfaces 125 of the keys 126.

The DBNC 180 also includes a back ball nut coupler 120". The back BNC 120" works in an opposite manner from the front BNC (See FIG. 19) 120'. Accordingly, to engage the back BNC 120", the roller cage 122" and rollers 124" are rotated to the inside surfaces 125" of the back BNC keys 126" in order to drive the keys 126" outward.

Referring now to FIGS. 18, 19 and 20, during normal operation, the back BNC keys 126" are held outward to keep the extension arms 182 from the back ball nut 20" connected to the output rod 22. When the back ball nut 20" is to be disconnected, the BNC keys 126" are driven inward when the roller cage 122" and rollers 124" are rotated off the inside surfaces 125" of the keys 126".

What is claimed is:

1. An electromechanical actuator, comprising:
    a motor having a motor drive train that drives a first driven member, the first driven member operatively engaged with a second driven member that is axially movable relative to the first driven member to control movement of an output rod connected to a movable surface;
    a damper assembly selectively coupled to the output rod and including a damper and a damper drive train, wherein,
    in a normal motor operating state, the output rod is coupled to the second driven member to thereby control movement of the movable surface with the motor; and
    in a motor malfunction state, the damper assembly is engaged with the output rod to provide a controlled rate of return of the movable surface to a fail-safe position, and
    wherein the damper assembly further includes a latch that restricts movement of the output rod in a fail-safe mode of the actuator and thereby restricts movement of the movable surface.

2. The electromechanical actuator of claim 1, wherein the damper assembly further includes a damper detent mechanism which couples the output rod to the damper in a normal damper operating state and which decouples the output rod from the damper in a damper malfunction state.

3. The electromechanical actuator of claim 1, wherein the damper assembly includes a first damper driven member coupled to the damper drive train, a second damper driven member coupled to and axially movable relative to the first damper driven member, and
    wherein the latch engages the second damper driven member in the fail-safe mode to thereby limit movement of the second damper driven member relative to the first damper driven member.

4. The electromechanical actuator of claim 1 wherein one of the first or second driven members is a nut, the actuator further comprising:
    a nut disconnect system including at least one coupler key movable between a locked position, in which the key maintains coupling between the output rod and the nut to thereby control movement of the output rod with the motor, and an unlocked position, in which the key decouples the output rod from the nut to thereby remove control of the output rod from the motor.

5. The electromechanical actuating assembly of claim 4, wherein the nut disconnect system includes a release mechanism operable to decouple the nut from the output rod by moving the key to the unlocked position.

6. The electromechanical actuating assembly of claim 5, wherein the release mechanism is powered by stored energy electronics that automatically release stored energy to activate the release mechanism upon a loss of power to the electromechanical actuating assembly.

7. The electromechanical actuating assembly of claim 6, wherein the nut disconnect system includes a drive mechanism coupled to the stored energy electronics and the release mechanism, the drive mechanism transmitting the stored energy from the stored energy electronics to the release mechanism to move the coupler key to the unlocked position.

8. The electromechanical actuating assembly of claim 4, wherein the damper assembly further includes a latch mechanism that restricts movement of the nut in a fail-safe mode.

9. The electromechanical actuating assembly of claim 8, further comprising a damper detent mechanism that couples the output rod to the damper in a normal damper operating state and that decouples the output rod from the damper in a damper malfunction state,
    wherein a drive mechanism is configured to provide the following operations in sequence: (i) lock the damper detent mechanism; (ii) trigger an electrical switch to enable the damper; (iii) enable the latch mechanism that restricts movement of the nut in fail-safe mode; and (iv) decouple the nut from the output rod.

10. The electromechanical actuating assembly of claim 9, further comprising stored energy electronics that automatically release stored energy to activate the drive mechanism,
    wherein the stored-energy electronics include a reset mechanism including a motor and a drive that reverses the sequence of operations of the drive mechanism.

11. An electromechanical actuator, comprising:
    a motor having a motor drive train that drives a first driven member, the first driven member operatively engaged with a second driven member that is axially movable relative to the first driven member to control movement of an output rod connected to a movable surface;
    a damper assembly selectively coupled to the output rod and including a damper and a damper drive train, the damper drive train operable in parallel relation to the motor drive train, wherein,
    in a normal motor operating state, the output rod is coupled to the second driven member to thereby control movement of the movable surface with the motor; and
    in a motor malfunction state, the damper assembly is engaged with the output rod to provide a controlled rate of return of the movable surface to a fail-safe position.

12. The electromechanical actuator of claim 11, wherein the damper assembly further includes a damper detent mechanism which couples the output rod to the damper in a normal damper operating state and which decouples the output rod from the damper in a damper malfunction state.

13. The electromechanical actuator of claim 11, the damper assembly further including a latch that restricts movement of the output rod in a fail-safe mode of the actuator and thereby restricts movement of the movable surface,
    wherein the damper assembly includes a first damper driven member coupled to the damper drive train, a second damper driven member coupled to and axially movable relative to the first damper driven member, and
    wherein the latch engages the second damper driven member in the fail-safe mode to thereby limit movement of the second damper driven member relative to the first damper driven member.

14. The electromechanical actuator of claim 11 wherein one of the first or second driven members is a nut, the actuator further comprising:
   a nut disconnect system including at least one coupler key movable between a locked position, in which the key maintains coupling between the output rod and the nut to thereby control movement of the output rod with the motor, and an unlocked position, in which the key decouples the output rod from the nut to thereby remove control of the output rod from the motor.

15. The electromechanical actuating assembly of claim 14, wherein the nut disconnect system includes a release mechanism operable to decouple the nut from the output rod by moving the key to the unlocked position.

16. The electromechanical actuating assembly of claim 15, wherein the release mechanism is powered by stored energy electronics that automatically release stored energy to activate the release mechanism upon a loss of power to the electromechanical actuating assembly.

17. The electromechanical actuating assembly of claim 16, wherein the nut disconnect system includes a drive mechanism coupled to the stored energy electronics and the release mechanism, the drive mechanism transmitting the stored energy from the stored energy electronics to the release mechanism to move the coupler key to the unlocked position.

18. The electromechanical actuating assembly of claim 14, wherein the damper assembly further includes a latch mechanism that restricts movement of the nut in a fail-safe mode.

19. The electromechanical actuating assembly of claim 18, further comprising a damper detent mechanism which couples the output rod to the damper in a normal damper operating state and which decouples the output rod from the damper in a damper malfunction state,
   wherein a drive mechanism is configured to provide the following operations in sequence: (i) lock the damper detent mechanism; (ii) trigger an electrical switch to enable the damper; (iii) enable the latch mechanism that restricts movement of the nut in fail-safe mode; and (iv) decouple the nut from the output rod.

20. The electromechanical actuating assembly of claim 19, further comprising stored energy electronics that automatically release stored energy to activate the drive mechanism,
   wherein the stored-energy electronics include a reset mechanism including a motor and a drive that reverses the sequence of operations of the drive mechanism.

* * * * *